United States Patent
Bruce et al.

(10) Patent No.: US 9,641,335 B2
(45) Date of Patent: May 2, 2017

(54) DISTRIBUTION OF USER CREDENTIALS

(71) Applicant: Axis AB, Lund (SE)

(72) Inventors: Mathias Bruce, Lund (SE); Niklas Hansson, Hörby (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 14/028,208

(22) Filed: Sep. 16, 2013

(65) Prior Publication Data
US 2015/0082032 A1 Mar. 19, 2015

(51) Int. Cl.
*H04L 9/32* (2006.01)
*G06F 9/46* (2006.01)
*G06F 21/41* (2013.01)
*H04L 29/06* (2006.01)

(52) U.S. Cl.
CPC ............... *H04L 9/32* (2013.01); *G06F 9/468* (2013.01); *G06F 21/41* (2013.01); *H04L 63/08* (2013.01); *H04L 63/083* (2013.01)

(58) Field of Classification Search
CPC ........... H04L 2029/06054; H04L 63/08; H04L 67/306
USPC ....................................................... 713/168
See application file for complete search history.

(56) References Cited

U.S. PATENT DOCUMENTS

| | | | |
|---|---|---|---|
| 6,292,904 B1 | 9/2001 | Broomhall et al. | |
| 7,676,829 B1 * | 3/2010 | Gui ........................ | G06F 21/31 726/5 |
| 7,788,709 B1 * | 8/2010 | Henry .................... | G06Q 40/00 380/270 |
| 8,769,637 B2 * | 7/2014 | Janzen .................... | G06F 21/31 380/255 |
| 2004/0210771 A1 | 10/2004 | Wood et al. | |
| 2005/0102291 A1 | 5/2005 | Czuchry, Jr. et al. | |
| 2006/0106936 A1 | 5/2006 | De Luca et al. | |

(Continued)

OTHER PUBLICATIONS

Wikipedia, Article explaining Shadow Password as used since 1988, [online]. Wikipedia [retreived on Jan. 30, 2015]. Retrieved from the Internet <URL: http://en.wikipedia.org/wiki/Passwd>.*

(Continued)

*Primary Examiner* — Benjamin Lanier
*Assistant Examiner* — David Massie
(74) *Attorney, Agent, or Firm* — Snyder, Clark, Lesch & Chung, LLP

(57) ABSTRACT

A method relates to distributing user credentials in a distributed physical access control system, and more generally to distributing user credentials in a distributed system. A method may include storing a user credential database (DB), a first transformed credential DB and a second transformed credential DB for authenticating users to access a first and a second service provided by the device. The method may include generating the first transformed credential DB and the second transformed credential DB based on the user credential DB and comparing a credential received from a user to the first or the second transformed credential DB to determine whether to grant access to the first or the second service. The method may include distributing the user credential DB to a plurality of other devices connected in a network for the other devices to generate transformed credential DBs for authenticating users to access services.

21 Claims, 16 Drawing Sheets

(56) References Cited

U.S. PATENT DOCUMENTS

| | | |
|---|---|---|
| 2007/0052517 A1 | 3/2007 | Bishop et al. |
| 2008/0186130 A1 | 8/2008 | Trevino et al. |
| 2009/0064290 A1 | 3/2009 | Norman et al. |
| 2009/0077638 A1 | 3/2009 | Norman et al. |
| 2010/0269156 A1* | 10/2010 | Hohlfeld ............. G06F 21/6218 726/4 |
| 2012/0096131 A1 | 4/2012 | Bhandari et al. |
| 2013/0086210 A1 | 4/2013 | Yiu et al. |
| 2013/0212385 A1* | 8/2013 | Schechter ............... G06F 21/31 713/168 |

OTHER PUBLICATIONS

Wikiedia Article explaining Shadow Password as used since 1988, [online]. Wikipedia [retrieved on Jan. 30, 2015]. Retrieved from the internet<URL:https://en.wikipedia.org/wiki/Passwd>.*

Shadow Reference—showing the page was created in Feb. 2013 [online]. Wikipedia [retrieved on Aug. 24, 2015]. Rereived from the internet<URL:https://en.wikipedia.org/w/index.php?title=Passwd&oldid=540578130>.*

Wikipedia, Article explaining Shadow Password [online]. Wikipedia [retrieved on Jan. 30, 2015]. Retrieved from the internet<URL: https://en.wikipedia.org/w/index.php?title=Passwd&oldid=540576875 >.*

European Search Report, dated Feb. 20, 2014, issued in European Application No. EP 13 18 5583.5, 9 pages.

* cited by examiner

ADMINISTRATOR
CREDENTIAL DB
354

| ADMINISTRATOR USERNAME 702 | ENCRYPTED PASSWORD 704 | ENCRYPTED MASTER KEY 706 |
|---|---|---|
| ADMIN1 | C(PW1, MASTER KEY) | C(MASTER KEY, PW1) |
| ADMIN2 | C(PW2, MASTER KEY) | C(MASTER KEY, PW2) |

USER
CREDENTIAL DB
360

| USERNAME 742 | SERVICE 744 | DEVICE 746 | CREDENTIAL 748 |
|---|---|---|---|
| MAGNUS | SSH, VPN | ALL | MONKEY |
| SABINA | SSH, VPN | ALL, NOT CAMERA 260 | LETMEIN |

FIG. 7B (UPDATED) USER
CREDENTIAL DB
360'

| USERNAME 742 | SERVICE 744 | DEVICE 746 | CREDENTIAL 748 |
|---|---|---|---|
| MAGNUS | SSH, VPN | ALL | MONKEY |
| SABINA | SSH, VPN | ALL, NOT CONTROLLER 210-F | GOTLAND |
| GUNNAR | VPN | CONTROLLERS 210-A, 210-B, 210-C, NOT CAMERA 260 | MUNKKALLAREN |

FIG. 7C

FIRST SERVICE
(FIRST TRANSFORMED)
CREDENTIAL DB
356

SSH CREDENTIAL TABLE

| USERNAME 722 | TRANSFORMED CREDENTIAL 724 |
|---|---|
| MAGNUS | SDFGH |
| SABINA | UYDAG |

FIG. 7D

(UPDATED) FIRST SERVICE
(FIRST TRANSFORMED)
CREDENTIAL DB
356'

UPDATED SSH CREDENTIAL TABLE

| USERNAME 722 | TRANSFORMED CREDENTIAL 724 |
|---|---|
| MAGNUS | SDFGH |
| SABINA | DSISO |

FIG. 7E

SECOND SERVICE
(SECOND TRANSFORMED)
CREDENTIAL DB
358

VPN CREDENTIAL DB

| USERNAME 732 | TRANSFORMED CREDENTIAL 734 |
|---|---|
| MAGNUS | SDFGH |
| SABINA | UHYRV |

FIG. 7F

(UPDATED) SECOND SERVICE
(SECOND TRANSFORMED)
CREDENTIAL DB
358'

UPDATED VPN CREDENTIAL DB

| USERNAME 732 | TRANSFORMED CREDENTIAL 734 |
|---|---|
| MAGNUS | SDFGH |
| SABINA | UYTRW |
| GUNNAR | JKOUT |

FIG. 7G

DISTRIBUTION OF USER CREDENTIALS

FIELD

This disclosure relates to distributing user credentials in a physical access control system, and more generally to distributing user credentials.

BACKGROUND INFORMATION

Access control systems may be used to control physical access to a facility. An access control system (as well as other types of control systems) may have numerous controllers, each offering various services to users. Each service on each controller may require credentials for authenticating the user to authorize access to the service. As a result, users may be required to remember their credentials for each service on each device.

SUMMARY

In one embodiment, a device may include a memory to store a user credential database (DB), a first transformed credential DB for authenticating users for accessing a first service provided by the device, and a second transformed credential DB for authenticating users for accessing a second service provided by the device. The device may include a processor to update the first transformed credential DB and the second transformed credential DB based on the user credential DB, and compare a credential received from a user to the first transformed credential DB to authenticate the user for accessing the first service or compare the credential received from the user to the second transformed credential DB to authenticate the user for accessing the second service. The device may include a communication interface to distribute the user credential DB to a plurality of other devices connected in a peer-to-peer network for the other devices to generate transformed credential DBs for authenticating users to access services provided by the corresponding other device. The processor may receive the user credential DB from the other devices in the peer-to-peer network.

In one embodiment, the user credential DB may be an encrypted user credential DB, and the processor may decrypt the encrypted user credential DB and generate the first and second transformed credential DB based on the decrypted user credential DB. The communication interface may distribute the encrypted user credential DB to the other devices for the other devices to generate corresponding transformed credential DBs for authenticating users to access services provided by the device.

In one embodiment, the first service may include a secure shell server, a file transfer protocol server, a remote desktop protocol server, a virtual private network server, or a virtual network channel server. In this embodiment, the second service may be different than the first service and may include a secure shell server, a file transfer protocol server, a remote desktop protocol server, a virtual private network server, or a virtual network channel server.

In one embodiment, the processor may generate the first transformed credential DB by transforming credentials from the decrypted user credential DB using a cryptographic one-way function. The processor may also generate the second transformed credential DB by transforming credentials from the decrypted user credential DB using a cryptographic one-way function.

In one embodiment, the first transformed credential DB and the second transformed credential DB may each be configured to authenticate a same user with a same credential. In one embodiment, the processor may receive updated user credentials from an administrator, update the user credential DB, generate the first transformed credential DB and the second transformed credential DB based on the updated user credential DB. The communication interface may distribute the updated user credential DB to the other devices for the other devices to generate corresponding transformed credential DBs for authenticating users to access services provided by the corresponding device.

In one embodiment, the processor may decrypt the encrypted user credential DB based on a password received through the communication interface from an administrator. In one embodiment, the processor may decrypt an encrypted key, to generate a key, based on the password received through the communication interface from the administrator. The processor may also decrypt the encrypted user credential DB based on the key.

In one embodiment, the processor may decrypt an encrypted administrator password based on the key, to generate a decrypted administrator password. The processor may also authorize access when the password received from the administrator is identical to the decrypted administrator password.

One embodiment includes a method. The method may store a user credential database (DB), a first transformed credential DB for authenticating users to access a first service provided by a device, and a second transformed credential DB for authenticating users to access a second service provided by the device. The method may generate the first transformed credential DB and the second transformed credential DB based on the user credential DB. The method may compare a credential received from a user to the first transformed credential DB to authenticate the user for accessing the first service or comparing the credential received from the user to the second transformed credential DB to authenticate the user for accessing the second service. The method may also distribute the user credential DB to a plurality of other devices connected in a peer-to-peer network for the other devices to generate transformed credential DBs for authenticating users to access services provided by the other devices. The method may also receive the user credential DB from the other devices in the peer-to-peer network.

In one embodiment, the user credential DB may be an encrypted user credential DB and the method may decrypt the encrypted user credential DB and generating the first and second transformed credential DB based on the decrypted user credential DB. The method may also distribute the encrypted user credential DB to the other devices for each of the other devices to generate corresponding transformed credential DBs for authenticating users to access services provided by the corresponding device.

In one embodiment, the method may include generating the first transformed credential DB by transforming credentials from the decrypted user credential DB using a cryptographic one-way function. The method may generate the second transformed credential DB by transforming credentials from the decrypted user credential DB using a cryptographic one-way function.

In one embodiment, the first transformed credential DB and the second transformed credential DB are each configured to authenticate a same user with a same credential. In one embodiment, the method may include receiving updated user credentials from an administrator, updating the user credential DB and updating the first transformed credential DB and the second transformed credential DB based on the updated user credential DB. The method may also include distributing the updated user credential DB to the other devices for each of the other devices to generate corresponding transformed credential DBs for authenticating users to access services provided by the corresponding device.

In one embodiment, the method may include decrypting the encrypted user credential DB based on a password received through from an administrator. In one embodiment, the method may include decrypting an encrypted key, to generate a key, based on the password received from the administrator, and decrypting the encrypted user credential DB based on the key.

In one embodiment, the method may include decrypting an encrypted administrator password based on the key, to generate a decrypted administrator password. The method may include authorizing access when the password received from the administrator is identical to the decrypted administrator password.

One embodiment may include a system. The system may include a plurality of devices communicating over a network. Each device may include a memory to store a user credential database (DB), a first transformed credential DB for authenticating users to access a first service provided by the corresponding device, and a second transformed credential DB for authenticating users to access a second service provided by the corresponding device. Each device may include a processor to update the first transformed credential DB and the second transformed credential DB based on the user credential DB. The processor may compare a credential received from a user to the first or the second transformed credential DB to determine whether to grant access to the first or the second service. Each device may include a communication interface to distribute the user credential DB to the other devices for each of the other devices to generate corresponding transformed credential DBs for authenticating users to access services provided by the corresponding device. The communication interface may receive the user credential DB from the other devices.

In one embodiment of the system, the devices are connected in the peer-to-peer network and distribute the user credential DB among the devices in the peer-to-peer network. In one embodiment, the user credential DB is an encrypted user credential DB, and the processor is configured to decrypt the encrypted user credential DB and to generate the first and second transformed credential DB based on the decrypted user credential DB. In one embodiment of the system, the communication interface may distribute the encrypted user credential DB to the other devices for each of the other devices to generate corresponding transformed credential DBs for authenticating users to access services provided by the corresponding device.

In one embodiment of the system, the processor may generate the first transformed credential DB by transforming credentials from the decrypted user credential DB using a cryptographic one-way function, and may generate the second transformed credential DB by transforming credentials from the decrypted user credential DB using a cryptographic one-way function.

Other embodiments are described below. That is, the embodiments described above are only provided as examples.

BRIEF DESCRIPTION OF THE DRAWINGS

FIG. 7A is a block diagram of an exemplary administrator credential database in one embodiment;

FIGS. 7B and 7C are block diagrams of exemplary user credential databases in one embodiment;

FIGS. 7D through 7G are block diagrams of exemplary service credential databases in one embodiment;

DETAILED DESCRIPTION

The following detailed description refers to the accompanying drawings. The same reference numbers in different drawings identify the same or similar elements.

One embodiment described below relates to controllers in a physical access control systems (PACS). Other embodiments may include environments other than a PACS, such as controllers in systems for controlling different applications within building management, monitoring, and security systems. One embodiment may include controllers in a home automation system, for example.

As mentioned above, users may be required to remember credentials for each service provided by each controller. This can be burdensome for the user. In one embodiment described below, an administrator may manage user credentials to be the same on multiple controllers for multiple services. In another embodiment, the administrator may also manage user credentials stored in one controller from another controller, for example. One or more embodiments below relate to the distribution of user credentials in a physical access control system (e.g., a distributed physical access control system) in a particular environment. As described, other embodiments may relate to the distribution of user credential in other types of systems (e.g., other than a physical access control system). One embodiment may relate to a method and device storing user credentials on a device without the distribution of those credentials to other devices.

Figure 1:
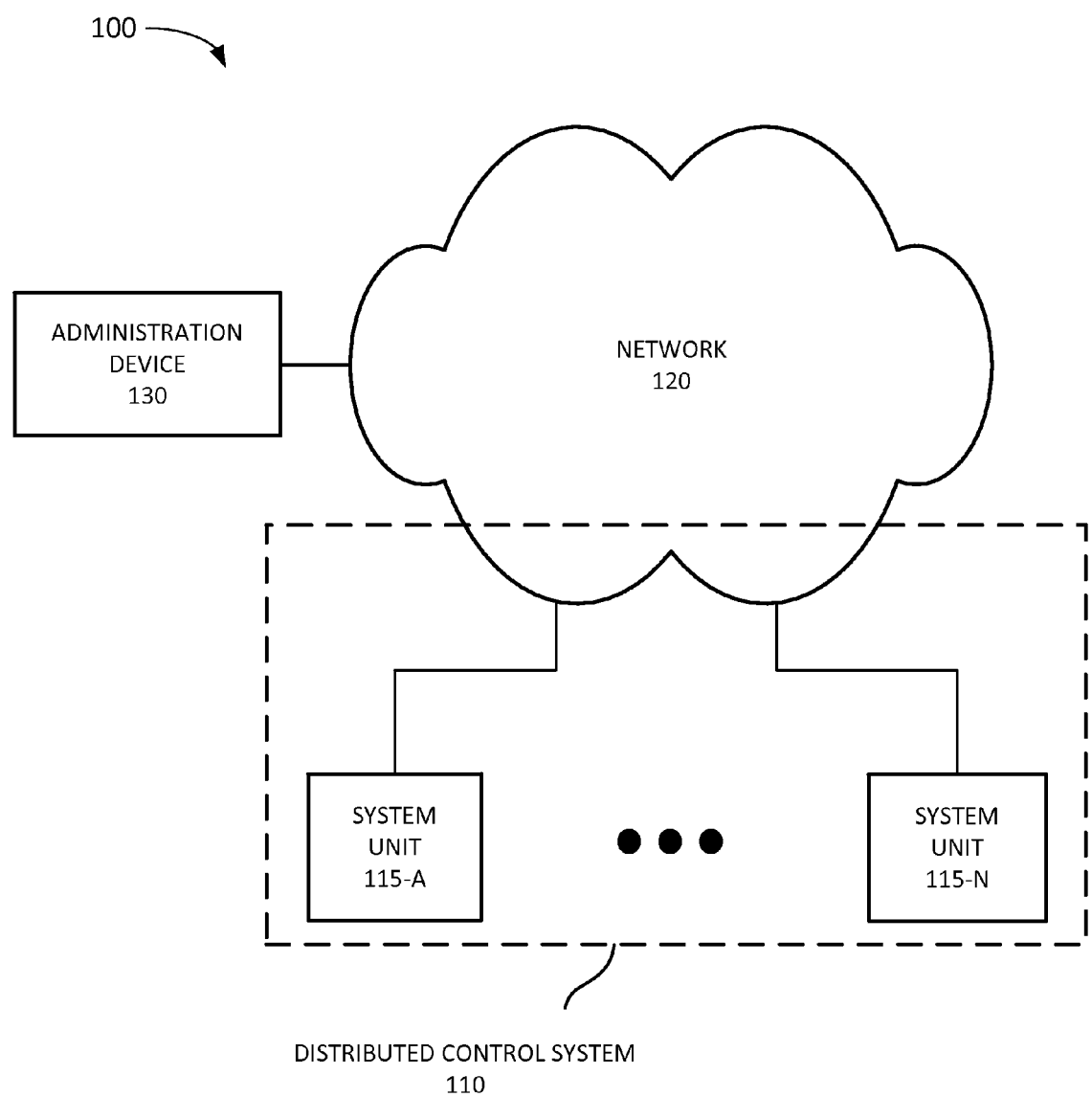
FIG. 1 is a block diagram illustrating an exemplary environment according to an embodiment described herein.

FIG. 1 is a block diagram of an exemplary environment 100 in which the systems and methods described below may be implemented. As shown in FIG. 1, environment 100 may include a distributed control system 110 (e.g., a distributed physical access control system), a network 120, and an administration device 130.

Distributed control system 110 may include a distributed computing system that includes system units 115-A to 115-N (referred to collectively as "system units 115" or "units 115," and individually as "unit 115"). In one embodiment, system unit 115 includes a physical access control device. For example, system unit 115 may include a controller that controls access to a secure area, such as a room or a group of rooms. System unit 115 may receive credentials (e.g., access card credentials) via a reader device and to determine whether the credentials are authentic and are associated with authority to access the secure area. If so, the controller may issue a command to open a lock on a door or perform other operations associated with granting access to the secure area.

Distributed control system 110 may include one or more distributed datasets. A distributed dataset includes data that is stored in a distributed (and potentially redundant) fashion in system units 115 that are associated with the distributed dataset. In one embodiment, distributed datasets are replicated on more than one device. For example, the entire distributed dataset may be stored in all the units 115. In another embodiment, one or more units 115 may store a subset of the distributed dataset. Also, a distributed dataset may be associated with all system units 115 or may be associated with a subset of system units 115.

In one embodiment, consensus is reached among units 115 in order for a change to be made in the distributed dataset (e.g., a consensus-based distributed database). System unit 115 may propose a change to a consensus-based distributed dataset. If the change is accepted by a quorum of units 115 associated with the distributed dataset, a consensus may be reached and the change may be propagated to each local copy of the distributed dataset in each associated unit 115. Thus, a consensus with respect to a change in the distributed dataset may be reached if a quorum of the associated units 115 votes for the change. A quorum may correspond to the smallest majority of the associated units 115. Thus, if a distributed dataset is associated with N units 115, a quorum may be reached if N/2+1 associated units 115 votes for the change if N is an even number, or if (N−1)/2+1 associated units 115 votes for the change if N is an odd number. Requiring a smallest majority to reach a quorum may ensure that when considering two conflicting proposals, at least one system unit 115 receives both proposals and selects one of the proposals for consensus.

A consensus-based distributed dataset may ensure that any system unit 115 associated with the distributed dataset includes the information (e.g., all the information in one embodiment) managed by the distributed dataset. For example, a distributed dataset may include access rules and the access rules may be available to any system unit 115 associated with the distributed dataset. Thus, as a result of the one or more distributed datasets, in one embodiment, control system 110 may correspond to a decentralized system with no central controlling device, such as a server device. In other embodiments, control system 110 may include both a decentralized system and a central controlling device (such as a server device). Changes to control system 110 may be configured at any system unit 115 and if the change is associated with a distributed dataset, the change may be propagated to other system units 115 associated with the distributed dataset. Furthermore, control system 110 may exhibit robustness with respect to device failure, as a single point of failure may be avoided. For example, if a particular system unit 115 fails, the other units 115 may continue to operate without loss of data (or with the minimization of loss of data). In another embodiment, a change may be made to the distributed dataset without consensus.

Network 120 may enable units 115 to communicate with each other and/or may enable administration device 130 to communicate with particular units 115. Network 120 may include one or more circuit-switched networks and/or packet-switched networks. For example, network 120 may include a local area network (LAN), a wide area network (WAN), a metropolitan area network (MAN), a Public Switched Telephone Network (PSTN), an ad hoc network, an intranet, the Internet, a fiber optic-based network, a wireless network, and/or a combination of these or other types of networks.

Administration device 130 allows an administrator to connect to a particular unit 115 in order to configure control system 110, change a configuration of control system 110, receive information from control system 110, and/or otherwise administer control system 110. Administration device 130 may include any device configured for communicating with one or more of units 115. For example, administration device 130 may include a portable communication device (e.g., a mobile phone, a smart phone, a phablet device, a global positioning system (GPS) device, and/or another type of wireless device); a personal computer or workstation; a server device; a laptop, tablet, or another type of portable computer; and/or any type of device with communication capability. In one embodiment, administration device 130 may be part of unit 115. As such, an administrator may administer control system 110 from one or more of units 115.

Although FIG. 1 shows exemplary components of environment 100, in other implementations, environment 100 may include fewer components, different components, differently arranged components, or additional components than depicted in FIG. 1. Additionally or alternatively, any one device in environment 100 (or any group of devices) may perform functions described as performed by one or more other devices in environment 100.

Figure 2A:
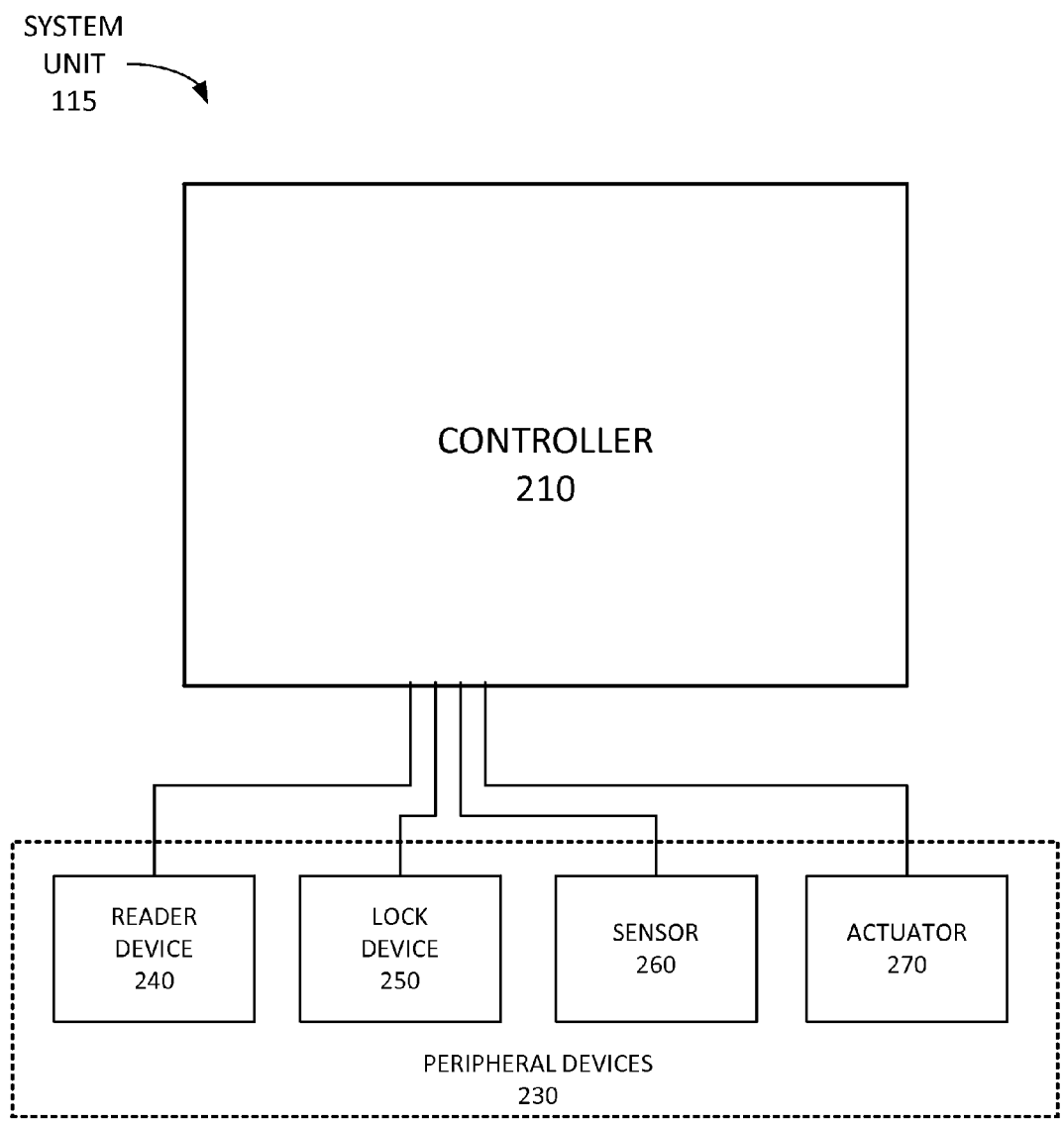
FIGS. 2A and 2B are block diagrams illustrating exemplary components of the system unit of FIG. 1.
Figure 2B:
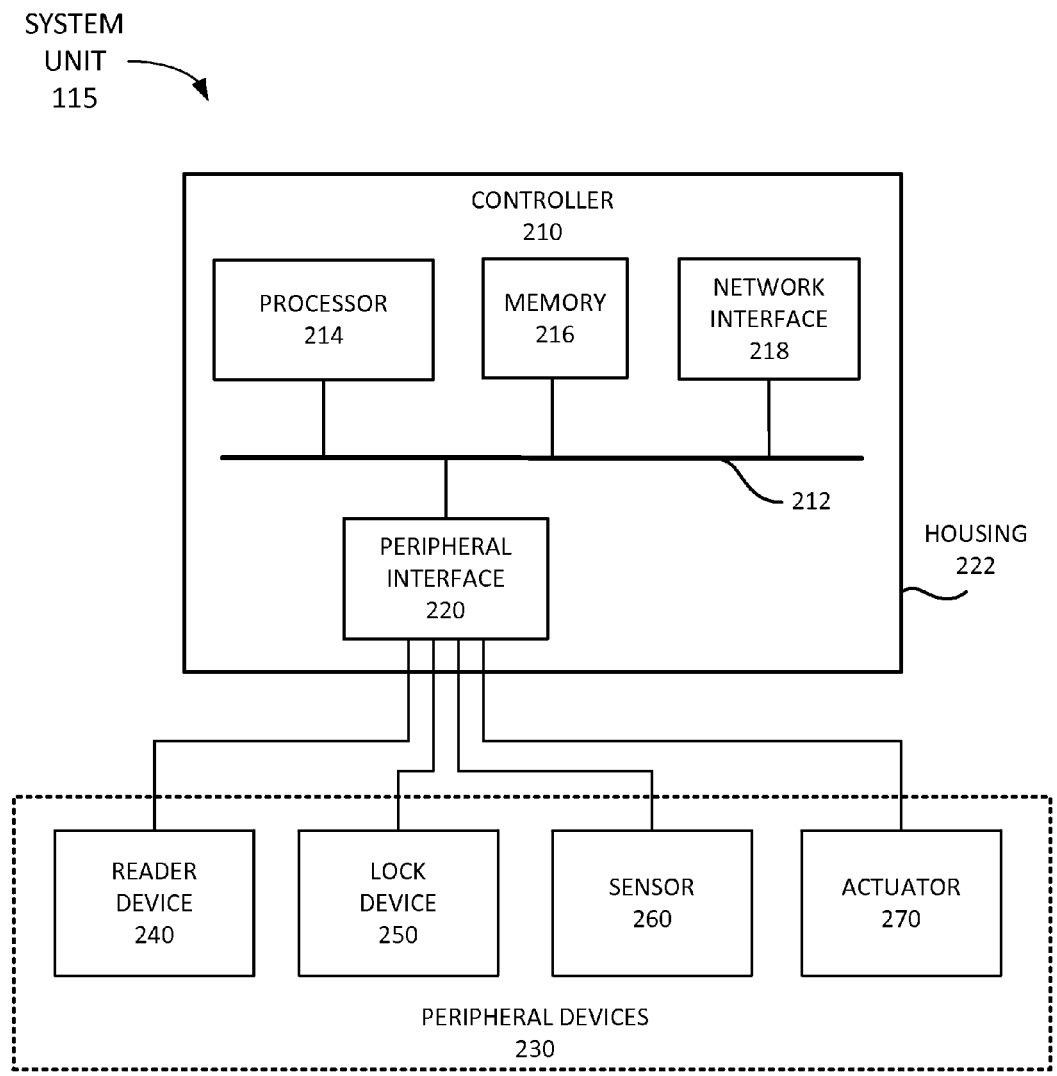

FIGS. 2A and 2B are block diagrams illustrating exemplary components of a unit 115. As shown in FIG. 2A, unit 115 may include a controller 210 and one or more peripheral devices 230. Controller 210 may control the operation of unit 115, may communicate with other units 115, may communicate with administration device 130, and/or may control peripheral devices 230. Peripheral devices 230 may include devices that provide information to controller 210, that are controlled by controller 210, and/or that otherwise communicate with controller 210. In one embodiment, peripheral devices 230 may include any type of security device. For example, peripheral devices 230 may include security devices, such as a reader device 240, a lock device 250, a sensor 260 (e.g., a camera), and/or an actuator 270.

As shown in FIG. 2B, controller 210 may include a bus 212, a processor 214, a memory 216, a network interface 218, a peripheral interface 220, and a housing 222. Bus 212 includes a path that permits communication among the components of controller 210. Processor 214 may include any type of single-core processor, multi-core processor, microprocessor, latch-based processor, and/or processing logic (or families of processors, microprocessors, and/or processing logics) that interprets and executes instructions. In other embodiments, processor 214 may include an integrated circuit, and application-specific integrated circuit (ASIC), a field-programmable gate array (FPGA), and/or another type of integrated circuit or processing logic. Processor 214 may include multiple processors (e.g., in the same or separate chips) that may each perform a different function. For example, processor 214 may include a circuit (e.g., an ASIC) dedicated to encrypting and decrypting data as well as a microprocessor.

Memory 216 stores information, data, and/or instructions. Memory 216 may include any type of dynamic, volatile, and/or non-volatile storage device. Memory 216 may store instructions, for execution by processor 214, or information for use by processor 214. For example, memory 216 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Network interface 218 may include a transceiver (e.g., a transmitter and/or a receiver) that enables controller 210 to communicate (e.g., transmit and/or receive data) with other devices and/or systems via wired communication links (e.g., conductive wire, twisted pair cable, coaxial cable, transmission line, fiber optic cable, and/or waveguide, etc.), wireless communication links (e.g., radiofrequency, infrared, and/or visual optics, etc.), or a combination of wireless and wired communication links. Network interface 218 may include a transmitter that converts baseband signals to radiofrequency (RF) signals and/or a receiver that converts RF signals to baseband signals. Network interface 218 may be coupled to an antenna for transmitting and receiving RF signals.

Network interface 218 may include a logical component that includes input and/or output ports, input and/or output systems, and/or other input and output components that facilitate the transmission of data to other devices. For example, network interface 218 may include a network interface card (e.g., Ethernet card) for wired communications and/or a wireless network interface (e.g., a WiFi) card for wireless communications. Network interface 218 may also include a universal serial bus (USB) port for communications over a cable, a Bluetooth wireless interface, a radiofrequency identification (RFID) interface, a near-field communications (NFC) wireless interface, and/or any other type of interface that converts data from one form to another form.

Peripheral interface 220 may be configured to communicate with one or more peripheral devices 230. For example, peripheral interface 220 may include one or more logical components that include input and/or output ports, input and/or output systems, and/or other input and output components that facilitate the transmission of data to peripheral devices 230. As an example, peripheral interface 220 may communicate with peripheral devices 230 using a Serial Peripheral Interface Bus protocol (e.g., the Wiegand protocol, and/or the RS-485 protocol). As another example, peripheral interface 220 may use a different type of protocol. In one embodiment, network interface 218 may also act as a peripheral interface for coupling peripherals 230 to controller 210.

Housing 222 may enclose the components of controller 210 and may protect the components of controller 210 from the environment. In one embodiment, housing 222 may include one or more of peripheral devices 230. In another embodiment, housing 222 may include administration device 130. Housing 222 may define the boundaries of one system unit 115 and/or controller 210 from other system units 115 and/or controllers 210 in a system with more than one system unit 115 and/or more than one controller 210.

As described below, controller 210 may perform operations relating to distributing user credentials for one or more services on one or more devices. Controller 210 may perform these operations as a result of hardwired circuitry of an ASIC. Controller 210 may also (or alternatively) perform these operations in response to processor 214 executing software instructions contained in a computer-readable medium, such as memory 216. A computer-readable medium may include a non-transitory memory device. Memory 216 may be implemented within a single physical memory device or spread across multiple physical memory devices. The software instructions may be read into memory 216 from another computer-readable medium or from another device. The software instructions contained in memory 216 may cause processor 214 to perform processes described herein. Thus, implementations described herein are not limited to any specific combination of hardware circuitry and software.

Returning to peripheral devices 230, reader device 240 may include a device that reads credentials from a user and provides the credentials to controller 210. For example, reader device 240 may include a keypad configured to receive an alphanumeric personal identification number (PIN) from a user; a card reader to configure a card that stores a card code on a magnetic strip or another type of storage device, such as a radiofrequency identification (RFID) tag; a fingerprint reader configured to read a user's fingerprint; an iris reader configured to read a user's iris; a microphone and a voice signature identifier configured to record a user's voice signature; an NFC reader; a camera that is associated with facial recognition software; and/or another type of reader device. Reader device 240 may include any type security device that can provide credentials, and may include one or more sensor devices, such any sensor device described below with reference to sensor 260. For example, reader device 240 may include a camera used for facial recognition and/or a microphone used for voice recognition. In this case, the user's voice or face, for example, may be the credentials of the user.

Lock device 250 may include a lock controlled by controller 210. Lock device 250 may lock a door (e.g., prevent it from opening or closing), a window, an HVAC vent, and/or another type of access opening to a secure area. For example, lock device 250 may include an electromagnetic lock; a mechanical lock with a motor controlled by controller 210; an electromechanical lock; and/or another type of lock.

Sensor 260 may include a sensing device. As examples, sensor 260 may include a door sensor to sense whether a door is open or closed; a visible light monitoring device (e.g., a camera), an infrared (IR) light monitoring device, a heat signature monitoring device, an audio monitoring device (e.g., a microphone), and/or another type of monitoring device; an alarm sensor, such as a motion sensor, a heat sensor, a pressure sensor, and/or another type of alarm sensor; a tamper sensor, such as a position sensor located inside unit 115; and/or a "request to exit" button located within a secured area associated with unit 115; and/or another type of sensor device. In the examples below, sensor 260 may be referred to as "camera 260."

Actuator 270 may include an actuator device. As an example, actuator 270 may control an illumination device. As other examples, actuator 270 may include a burglar alarm activator; a speaker to play messages or generate alarm signals; a display device; a motor to move sensor 260 (e.g., control the field of view of a camera or other monitoring device); a motor for opening/closing a door, window, HVAC vent, and/or another opening associated with a secure area; a motor to secure lock device 250 in a locked or unlocked position; a fire extinguishing device; and/or another type of actuator device.

Although FIGS. 2A and 2B show exemplary components of unit 115, in other implementations, unit 115 may include fewer components, different components, additional components, or differently arranged components than depicted in FIGS. 2A and 2B. For example, although a single reader device 240, a single lock device 250, a single sensor 260, and a single actuator 270 are shown in FIG. 2A, in practice, peripheral devices 230 may include multiple reader devices 240, multiple lock devices 250, multiple sensors 260, and/or multiple actuators 270. Peripheral devices 230 may also not include one or more of the devices shown in FIG. 2A. Additionally or alternatively, any component of unit 115 (or any group of components) may perform the task or tasks described as performed by one or more other components of unit 115.

Further, although exemplary distributed control system 110 includes a physical access distributed control system, other implementations may control systems other than physical access. On the other hand, distributed control system 110 may include any type of physical access control systems (e.g., in an operational environment), such as a control system for opening and/or closing a door or controlling physical access to a building or facility. Distributed control system 110 may also include a system to control a fan (e.g., start or stop), to initiate an alarm in a building management system (e.g., failed authentication, successful authentication, etc.), or to control a robot arm in an industrial automation system.

Figure 3A:
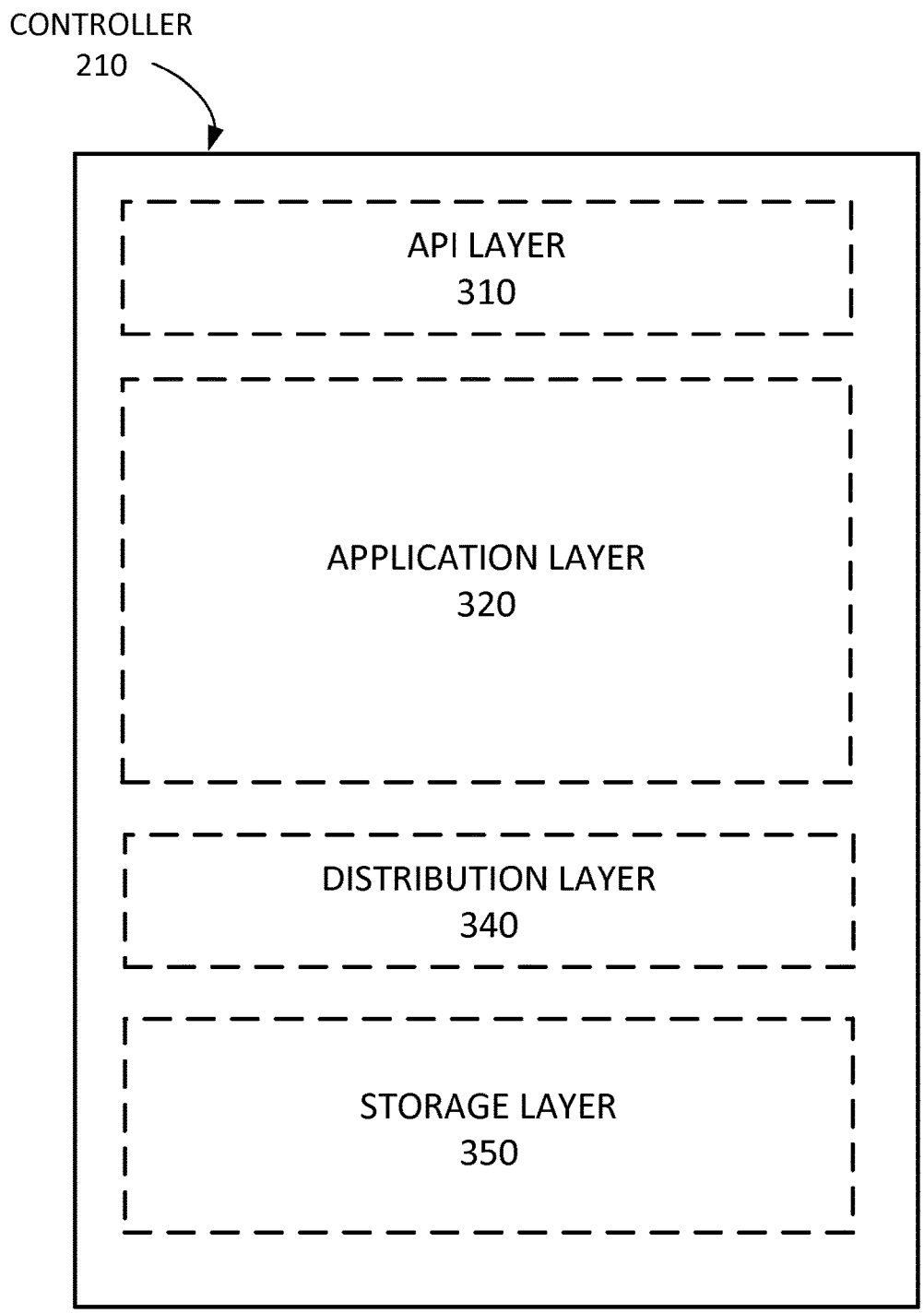
FIGS. 3A and 3B are block diagrams illustrating functional components of the system unit of FIG. 1 in one embodiment.

FIG. 3A is a block diagram illustrating exemplary functional layers of system unit 115. As shown in FIG. 3A, unit 115 may include an application program interface (API) layer 310, an application layer 320, a distribution layer 340, and a storage layer 350.

API layer 310 includes an API configured to communicate, e.g., with administration device 130. When an administrator uses administrator device 130 to log into unit 115, API layer 310 may communicate with administrator device 130 to authenticate the administrator. As another example, API layer 310 may communicate with administrator device 130 to change a configuration of unit 115. API layer 310 may receive data from administrator device 130 and provide the data to distribution layer 340 and/or to storage layer 350. API layer 310 may also communicate with administrator device 130 to install an application in application layer 320. API layer 310 may be configured to handle different administrator types. For example, API layer 310 may include an API to handle a Web Services administrator, a Linux administrator, an Open Network Video Interface Forum (ONVIF) administrator, and/or another type of API.

Application layer 320 may include one or more applications installed on unit 115. Applications may include a control logic application, a door control application to open and close doors, a reader control application to receive user credentials, among other applications. Applications are discussed in more detail with respect to FIG. 3B.

Distribution layer 340 may manage one or more distributed datasets associated with units 115. For example, distribution layer 340 may connect controllers 210 in a peer-to-peer network for the distribution of datasets. Distribution layer 340 may use a protocol (e.g., a PAXOS protocol) to establish a consensus with respect to a change in a particular consensus-based distributed dataset. As an example, distribution layer 340 may send a proposal for a change to other system units 115 associated with the distributed dataset and may receive a quorum for the change from the other system units 115. As another example, distribution layer 340 may vote for a proposal received from another unit 115. As yet another example, distribution layer 340 may receive an indication that a consensus has been reached for a change without having voted for the change. When an indication of consensus for a change is received, distribution layer 340 may make the change in the local copy of the distributed dataset. Distribution layer 340 may maintain secure connections with other units 115 over network 120. (e.g., a Transport Layer Security (TLS) connection).

Storage layer 350 may store one or more datasets associated with unit 115. A dataset stored in storage layer 350 may correspond to a local dataset or may correspond to a distributed dataset. A local dataset may store information associated with (and/or only associated with) the particular unit 115 that stores the local dataset. A distributed dataset may store information associated with other system units 115 associated with the distributed dataset.

Figure 3B:
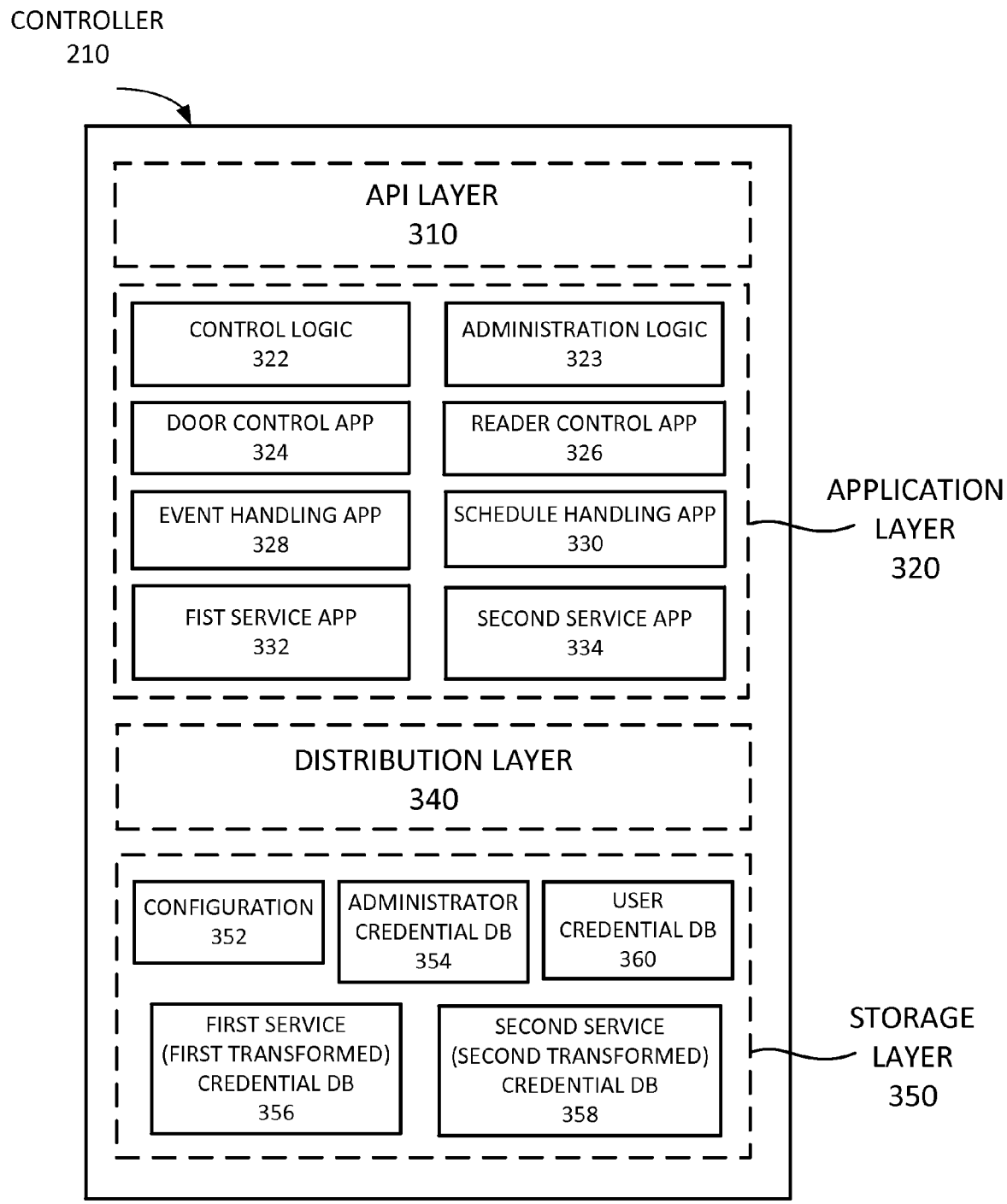

FIG. 3B is a block diagram of exemplary functional components of controller 210, with more detail provided for application layer 320 and storage layer 350. As shown in FIG. 3B, application layer 320 may include a control logic application 322 (or "control logic 322"), administrator authentication logic 323, a door control application 324, a reader control application 326, an event handling application 328, a schedule handling application 330, a first service application 332 (or "first service 332"), and/or a second service application 334 (or "second service 334"). Other applications may include, for example, alarm and control applications. The logic handling these functional components may involve different parts of controller 210 and/or system unit 115. That is, the logic handling these functional components may not be connected to a single hardware module, for example.

Control logic 322 may determine whether to grant physical access to a user based on received credentials and based on stored access rules. Administrator logic 323 may grant access (e.g., remote access such as a remote login) to an administrator and provide other administration processes. For example, administration logic 323 may authenticate an administrator based on credentials (e.g., a username and password), and authorize the administrator to access and update user credentials (e.g., for other administrators and/or for users who wish to be granted physical access), etc. In one embodiment, administration logic 323 may authorized an authenticated administrator to access and update user credentials for a particular system unit 115 or to update user credentials for other or even all system units 115. These functions of administration logic 323 are described below with respect to FIG. 3C.

Door control application 324 may control one or more doors and/or associated lock devices 250. For example, door control application 324 may determine whether a door is open or closed and/or locked or unlocked and may operate one or more device to open or close the door and/or to lock or unlock the door. Reader control application 326 may control one or more reader devices 240 and may obtain and process credentials received from the one or more reader devices 240. Event handling application 328 may process events recorded by unit 115, such as door opening events, alarm events, sensor events, and/or other types of logged events. Event handling application 328 may generate a report and/or an alarm and send the report and/or alarm to administrator device 130 (and/or to another designated device, such as other units 115). Schedule handling application 330 may manage one or more schedules associated with unit 115. For example, access rules for particular groups of users may change based on particular times of day.

First service application 332 and second service application 334 may provide services to authenticated administrators. Examples of services include secure shell (SSH) server, a file transfer protocol (FTP) server, a remote desktop protocol (RDP) server, a virtual private network (VPN) server, a virtual network channel (VNC) server, etc. Each controller 210 may include a different set of service applications. For example, one controller 210 may offer an SSH server and an RDP server, while another controller 210 may offer an SSH server and a VPN server.

As shown in FIG. 3B, storage layer 350 may store configuration data 352, administrator credential DB 354, first service credential DB 356, second service credential DB 358, and/or user credential DB 360.

Configuration data 352 stores configuration data associated with a particular unit 115, such as hardware configuration of controller 210, peripheral devices 230 connected to controller 210, application installed in application layer 320, or other types of configuration information. In one embodiment, configuration data 352 is not distributed to other controllers 210 as it is specific to the particular controller 210. In other embodiments, configuration data 352 may be distributed to as a backup to other controllers 210 without the configuration data 352 being used in the other controllers 210.

Administrator credential DB 354 stores the credentials (e.g., usernames and passwords) for authenticating users that can administer system unit 115 (e.g., with a remote login). Administrator credential DB 354 is described below with respect to FIG. 7A. In one embodiment, administrator credential DB 354 is distributed among other controllers 210 to allow the same administrators to administer system 110 from any of the controllers 210 or units 115.

First service credential DB 356 (or first transformed credential DB 356) and second service credential DB 358 (or second transformed credential DB 358) store the credentials (e.g., usernames and passwords) for authenticating users (e.g., additional administrators) that are authorized to access services provided by controller 210 (e.g., first service 332 or second service 334). First service 332 may use first service credential DB 356 to authenticate a user attempting to access first service 332, for example. Likewise, second service 334 may use second service credential DB 358 to authenticate a user attempting to access second service 334.

In one embodiment, the credentials in DBs 356 and/or 358 may not be stored in plain text (e.g., in an unencrypted format or a way that can reveal the credentials). In this embodiment, credential DBs 356 and/or 358 may store transformed user credentials. For example, in one implementation first service credential DB 356 may store credentials having been transformed with a cryptographic one-way function (e.g., a hash). In this example, first service credential DB 356 may store the username and the hash of the corresponding password. As another example, first service credential DB 356 may store the username and the salted hash of the corresponding password. First service credential DB 356 and second service credential DB 358 are described below with respect to FIGS. 7D through 7G.

User credential DB 360 may store the credentials (e.g., usernames and passwords) of users that can access services provided by system unit 115 (e.g., first service 332 and/or second service 334). In one embodiment, user credential DB 360 may store the same credential (or credentials) for the same user (or users) as are stored in service credential DBs (e.g., first service credential DB 356 and/or second service credential DB 358). In one implementation, user credential DB 360 stores credentials in a different way than credential DBs 356 and 358. For example, user credential DB 360 may store credentials in a way so as to reveal the credentials themselves (e.g., in a plaintext format or in an untransformed format), as opposed to service credential DBs 356 and/or 358 that store transformed credentials. In one embodiment, service credential DBs 356 and 358 may be transformed from or derived from user credential DB 360.

Figure 3C:
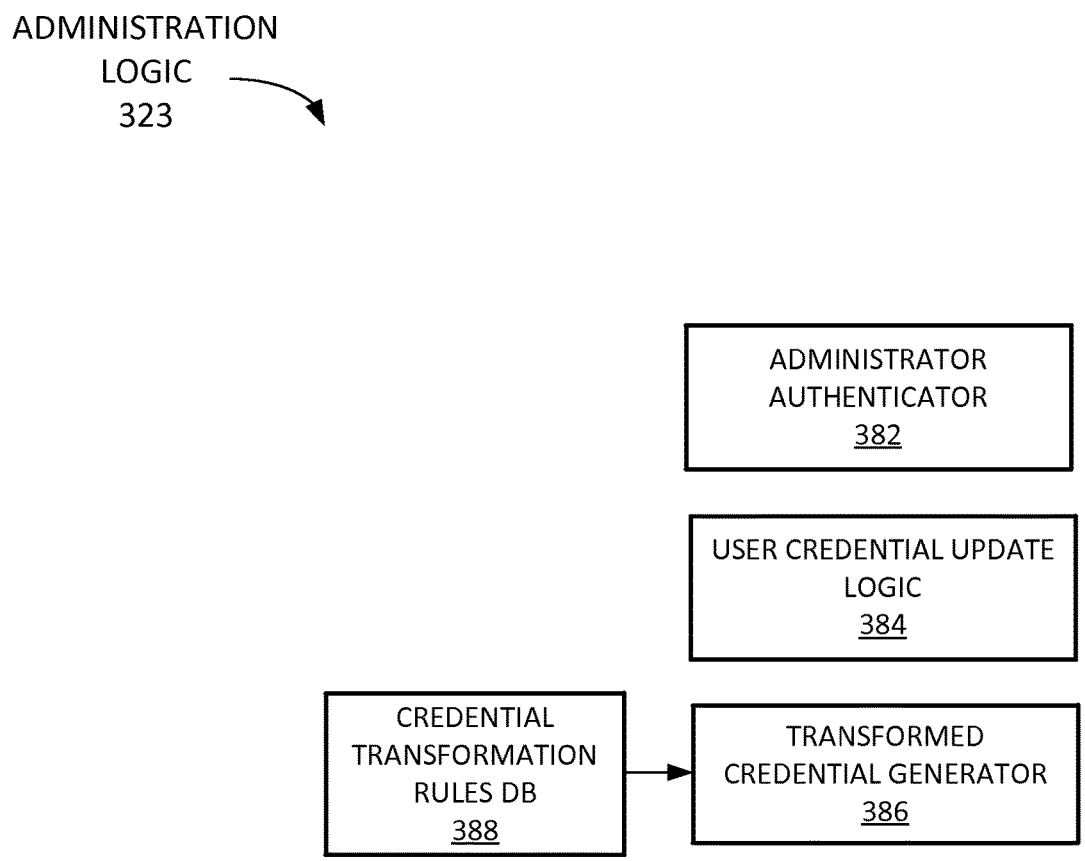
FIG. 3C is a block diagram illustrating functional components of the administration logic in the controller of FIG. 3B in one embodiment.

FIG. 3C is a block diagram of exemplary components of administration logic 323, which may include administrator authenticator 382, user credential update logic 384, transformed credential generator 386, and/or credential transformation rules DB 388. Administrator authenticator 382 receives credentials for administrators trying to log into controller 210, determines whether the credentials are authentic, and may authorize access to controller 210 (e.g., including the ability to edit and change user credential DB 360). User credential update logic 384 can receive changes and/or updates (e.g., from an administrator) to credentials associated with users of services of controller 210 (for storage in user credential DB 360). Transformed credential generator 386 may generate or update service credential DBs (e.g., first service credential DB 356 and second service credential DB 358) based on changes and/or updates to user credential DB 360. Transformed credential generator 386 may transform credentials based on information (e.g., rules and device specific information) stored in credential transformation rules DB 388. For example, rules DB 388 may indicate that for the SSH service, a password should be hashed using the SHA-224 algorithm with the hardware address (e.g., device specific information or MAC address) of the local machine. Further, in one embodiment, rules DB 388 may store the rules and device specific information for other controllers 210 in control system 110.

Although FIGS. 3A, 3B, and 3C show exemplary functional components of unit 115, in other implementations, unit 115 may include fewer functional components, different functional components, differently arranged functional components, or additional functional components than depicted in FIGS. 3A, 3B, and 3C. Additionally, any one of the components (or any group of components) of unit 115 may perform functions described as performed by one or more other functional components of unit 115. Further, the functional components of unit 115 may be implemented, for example, via hard-wired circuitry of one or more ASICs. Additionally or alternatively, the functional components of unit 115 may be implemented by processor 214 executing instructions from memory 216.

Figure 4:
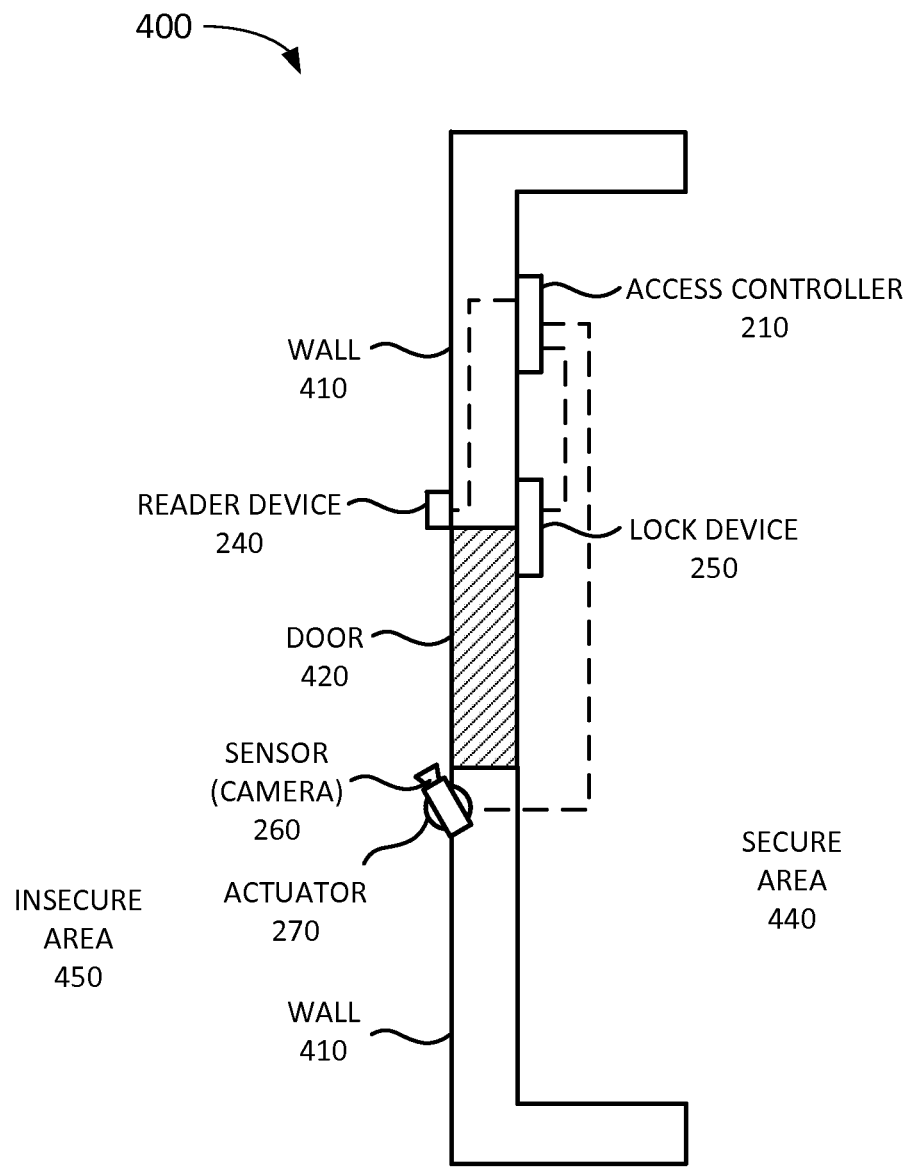
FIG. 4 is a floor plan illustrating an exemplary physical layout of the system unit of FIG. 1 in one embodiment.

FIG. 4 is a floor plan diagram illustrating an exemplary physical layout 400 of unit 115. As shown in FIG. 4, physical layout 400 may include a wall 410, a door 420, controller 210, reader device 240, lock device 250, sensor 260, and actuator 270.

Wall 410 encloses a secure area 440, such as a room in a building. Door 420 provides access for a user to secure area 440. In this embodiment, controller 210 is installed inside secure area 440. In other embodiments, controller 210 may be installed in an insecure area 450. Reader device 240 is installed outside secure area 440 and lock device 250 is installed inside secure area 440 to wall 410 and door 420. Sensor 260, in this example, is a monitoring device mounted outside secure area 440 in insecure area 450. Actuator 270 includes a motor used to control the field of view of the monitoring device in this example.

When a user enters credentials into reader device 240 (e.g., by entering a PIN, scanning an access card, scanning an iris, etc.), controller 210 may use the credentials to authenticate the identity of the user and may perform a lookup in an access rules table to determine whether to grant access to the user based on the identity of the user and the access rules. If controller 210 determines that access should be granted, controller 210 activates lock device 250 to unlock door 420, thus granting access to the user to secure area 440.

Although FIG. 4 shows exemplary components of physical layout 400, in other implementations, physical layout 400 may include fewer components, different components, additional components, or differently arranged components than depicted in FIG. 4. Additionally or alternatively, any one component (or group of components) in physical layout 400 may perform a task or tasks described as performed by one or more other components of physical layout 400.

Figure 5:
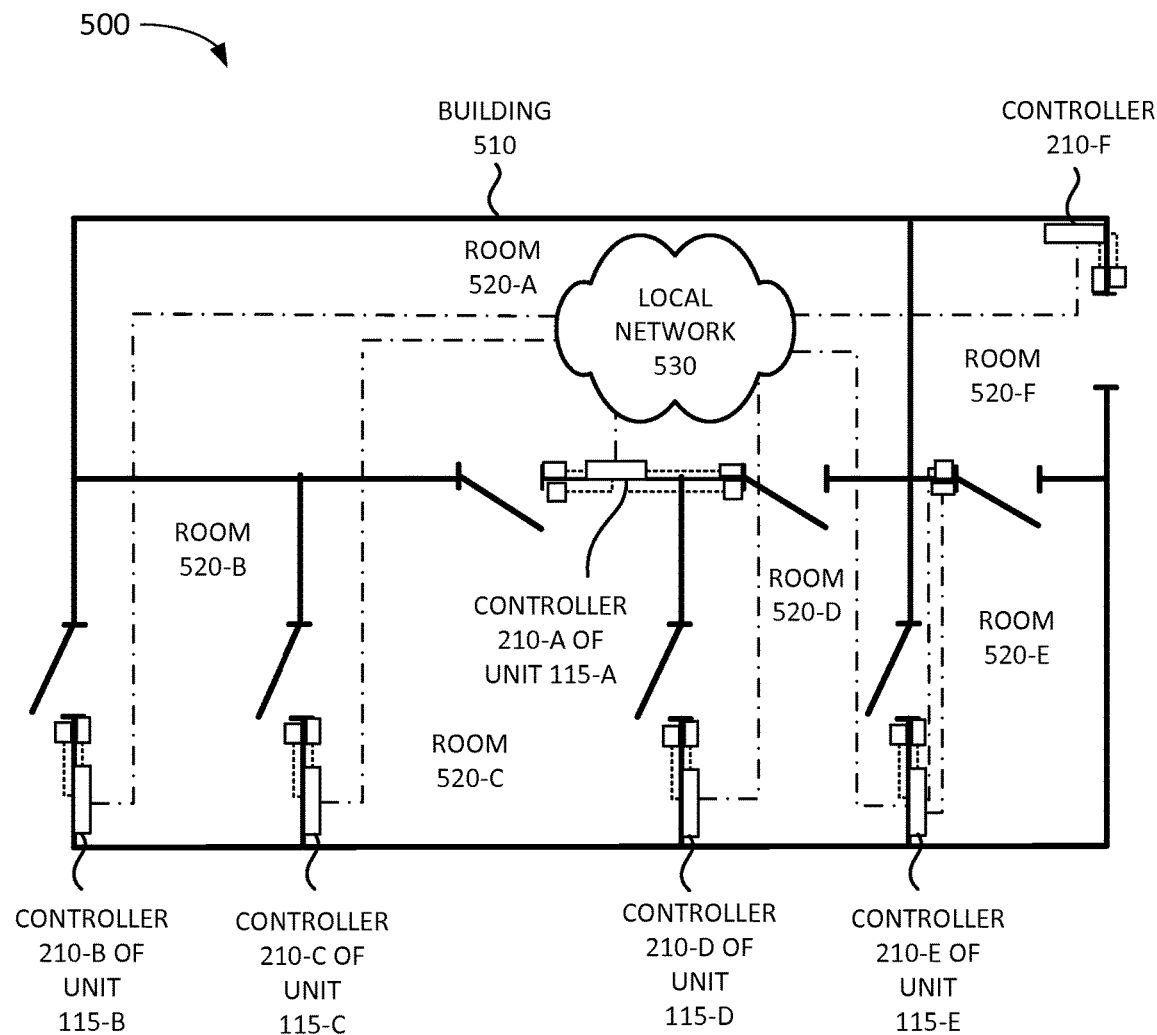
FIG. 5 is a floor plan diagram illustrating an exemplary physical layout of the distributed control system of FIG. 1.

FIG. 5 is a floor plan diagram illustrating an exemplary physical layout 500 of control system 110. As shown in FIG. 5, physical layout 500 may include a building 510 with rooms 520-A through 520-F. A local network 530, such as an Ethernet network, may interconnect system units 115-A through 115-F. In this example, system unit 115-A controls two doors into room 520-A; system unit 115-B controls an outside door into room 520-B; system unit 115-C controls one door from room 520-B to room 520-C, system unit 115-D controls one door from room 520-C to room 520-D; system unit 115-E controls one door from room 520-D to room 520-E; and unit 520-F controls an outside door into room 520-F.

In this example, system units 115-A to 115-F do not include a central controlling device (e.g., a server) and may include one or more distributed datasets. For example, system units 115-A through 115-F may maintain a distributed credentials table, a distributed access rules table, and/or a distributed events log. Assume an administrator uses administration device 130 to log into system unit 115-A to add a user and to add credentials associated with a user. Those added credentials may be distributed to the other system units 115 that control doors to rooms to which the user has access. If system unit 115-B fails, for example, data collected by system unit 115-B may continue to be available as a result of a distributed events log included in the other system units.

In FIG. 5, each unit 115 is associated with a controller 210. Further, in the implementation of FIG. 5, each controller 210 is in a different location (e.g., different room 520) than other controllers 210. In other implementations, some controllers 210 and units 115 may be located in different buildings, different geographic regions, different nations, different continents, etc., than other controllers and units 115. Despite their diverse locations, in one embodiment, units 115 and controllers 210 may be able to discover each other (or make a best effort to do so), form a peer-to-peer network, and distribute datasets.

Although FIG. 5 shows exemplary components of physical layout 500, in other implementations, physical layout 500 may include fewer components, different components, additional components, or differently arranged components than depicted in FIG. 5. For example, in another embodiment, a central controlling device (e.g., a server) may be used in conjunction with one or more distributed datasets. Additionally or alternatively, one or more components of physical layout 500 may perform one or more tasks described as performed by one or more other components of physical layout 500.

Figure 6:
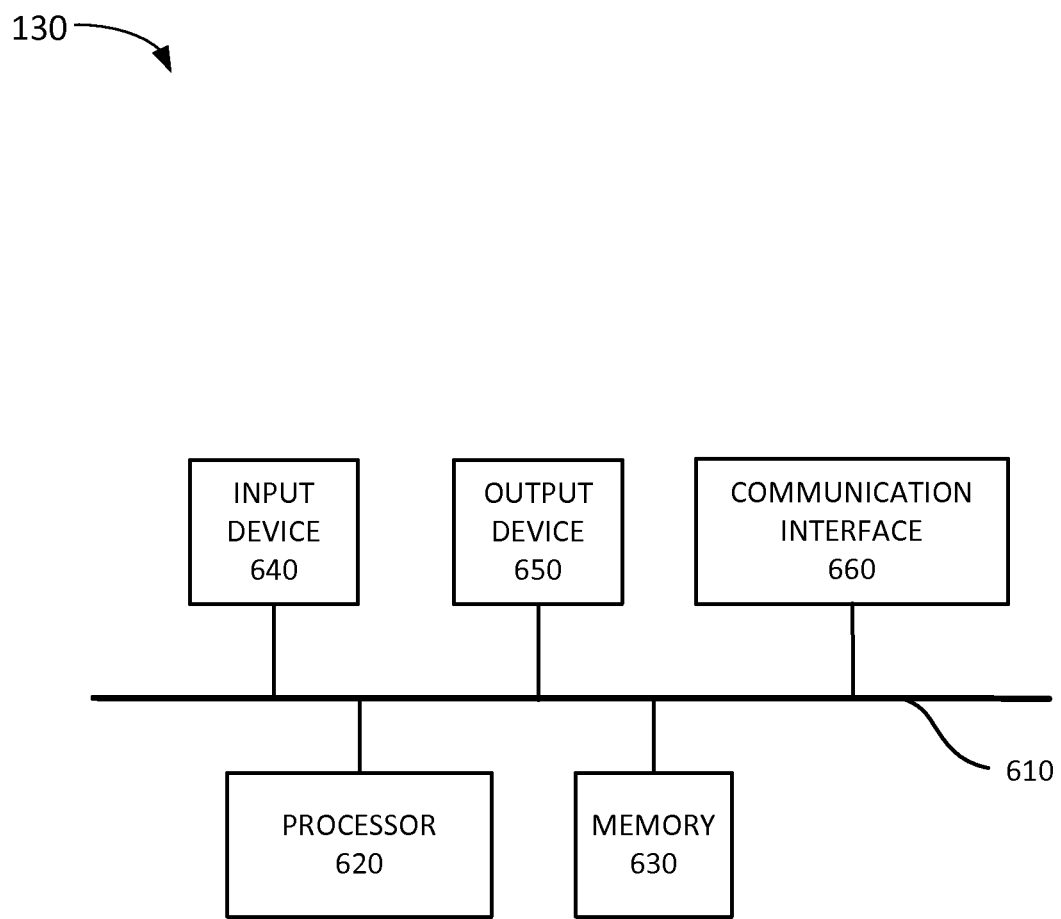
FIG. 6 is a block diagram illustrating exemplary components of the administration device of FIG. 1.

FIG. 6 is a block diagram illustrating exemplary components of administration device 130. As shown in FIG. 6, administration device 130 may include a bus 610, a processor 620, a memory 630, an input device 640, an output device 650, and a communication interface 660.

Bus 610 includes path that permits communication among the components of administration device 130. Processor 620 may include any type of single-core processor, multi-core processor, microprocessor, latch-based processor, and/or processing logic (or families of processors, microprocessors, and/or processing logics) that interprets and executes instructions. In other embodiments, processor 620 may include an ASIC, an FPGA, and/or another type of integrated circuit or processing logic.

Memory 630 stores information, data, and/or instructions. Memory 630 may include a dynamic, volatile, and/or non-volatile storage device. Memory 630 may store instructions, for execution by processor 620, or information for use by processor 620. For example, memory 620 may include a RAM, a ROM, a CAM, a magnetic and/or optical recording memory device, etc.

Input device 640 allows an operator to input information into administration device 130. Input device 640 may include, for example, a keyboard, a mouse, a pen, a microphone, a touch-screen display, etc. Output device 650 may output information to an operator of administration device 130. Output device 650 may include a display, a printer, a speaker, and/or another type of output device.

Communication interface 660 may include (e.g., a transmitter and/or a receiver) that enables controller 210 to communicate (e.g., transmit and/or receive data) with other devices and/or systems via wired communication links, wireless communication links, or a combination of wireless and wired communication links. Communication interface 660 may include a network interface card (e.g., Ethernet card) for wired communications and/or a wireless network interface (e.g., a WiFi) card for wireless communications.

Administration device 130 may perform operations relating to managing units 115 in system 110. Administration device 130 may perform these operations in response to processor 620 executing software instructions contained in a computer-readable medium, such as memory 630. The software instructions contained in memory 630 may cause processor 620 to perform these operations.

As mentioned above, controller 210 may authenticate administrators to manage the unit 115. FIG. 7A is a block diagram illustrating administrator credential DB 354 for this purpose in one embodiment. Administrator credential DB 354 may store a master key (e.g., an encrypted master key) for decrypting user credential DB 360 as well as credential information used to authenticate an administrator. In one embodiment, the master key may also be used to decrypt distributed database(s) in control system 110. The term "master" is used to differentiate from other keys described herein.

As shown in FIG. 7A, administrator credential DB 354 may include an administrator username field 702, an encrypted password field 704, and an encrypted master key field 706. Administrator username field 702 stores the username of the administrator. For example, the administrator credential DB 354 in FIG. 7A shows two administrator usernames: admin1 and admin2. Any number of administrator usernames may be listed in administrator credential DB 354 (i.e., any number of records or rows may be present in administrator credential DB 354).

Encrypted password field 704 stores the password for the corresponding username. In this embodiment, the password in field 704 has been encrypted with the master key that is stored in encrypted master key field 706. In other embodiments, password field 704 may store the corresponding password in an unencrypted format or encrypted with a key other than the master key. Rather than show an encrypted password in FIG. 7A, field 704 shows the function C (operand1, operand2) by which the encrypted password is generated. Function C encrypts operand1 using operand2 as the encryption key. Function C may be any encryption function. For example, the password in field 704 may be encrypted with the master key using a first function C1.

Encrypted master key field 706 stores the encrypted master key. In this embodiment, the master key has been encrypted with the corresponding administrator's password. Thus, administrator credential DB 354 stores the credentials for administrators and a key for decrypting user credential DB 360, but each is encrypted with the other. Administrator credential DB 354 is discussed below with respect to FIG. 8C. The master key in field 706 may be encrypted with the password using a second function C2. In one embodiment, processor 214 performs function C in a dedicated circuit (e.g., an ASIC), which may be external to other processors in controller 210.

Administrator credential DB 354 may include more, fewer, or different fields than shown in FIG. 7A. For example, in one embodiment, administrator username field 702 may be omitted. In another embodiment, the credential stored and/or used in administrator credential DB 354 may include types of credentials other than or in addition to a username and password. For example, a credential may include a biometric credential (e.g., a fingerprint or an iris scan), etc.

As mentioned above, an administrator may log into controller 210 to manage unit 115, which may include updating user credential DB 360. User credential DB stores credentials for other users or administrators to access services provided by controller 210. FIGS. 7B and 7C are block diagrams of an exemplary user credential DB in one embodiment (e.g., user credential DB 360 at two different times). User credential DB 360 may include a username field 742, service field 744, a device field 746, and/or a credential field 748. These fields are described below.

Username field 742 identifies the users authorized to access services in controller 210, such as first service 332 and second service 334. In user credential DB 360 (shown in FIG. 7B), the usernames include Magnus and Sabina. Any number of usernames is possible (e.g., any number of entries or records).

Service field 744 identifies the services for which the corresponding username is authorized to access (e.g., with the credential identified in credential field 748 on the device identified in device field 746). Services identified in service field 744 include an SSH server ("SSH") and a VPN server ("VPN"). Any number of services may be provided by any of the controllers 210.

Device field 746 identifies the devices (e.g., controller 210) that provide the service identified in service field 744 for the users identified in corresponding username field 742. As mentioned above, not all controllers 210 may provide the same (or even any) services. Further, some services for some devices may not be associated with credentials listed in credential field 748, for example. Device field 746 may identify "all" if, for example, the credential in credential field 748 should be associated with all devices with the corresponding username and corresponding service. Device field 746 may exclude a device (e.g., "not camera 260") if the credential stored in credential field 748 should not be associated with the corresponding service and corresponding username in a particular device (e.g., camera 260). Device field 746 may identify devices individually, such as reader 240, lock 250, and actuator 270.

Credential field 748 stores the credential used to authenticate the corresponding user (e.g., identified in username field 742) for the corresponding service or services (e.g., identified in service field 744) on the corresponding device or devices (e.g., identified in device field 746).

In one embodiment, a single or the same credential (identified in credential field 748) and/or a single or the same username (identified in username field 742) may be associated with multiple services (identified in service field 744) across one or more devices (identified in device field 746). In one embodiment, a single or the same credential (identified in credential field 748) and/or a single or the same username (identified in username field 742) may be associated with multiple devices (identified in device field 746) across one or more services (identified in service field 744).

In another embodiment, a credential (defined in credential field 748) (and corresponding password) may be associated with all devices in a network (e.g., a distributed physical access control system such as control system 110). Alternatively, a credential (defined in credential field 748) (and corresponding password) may be associated with less than all the devices in a network (e.g., not camera 260). That is, some controllers 210 may be excluded from (identified in credential field 748) being associated with a credential across multiple devices and/or multiple services.

Credential field 748 may store a credential in an untransformed manner. For example, if the credential is a password, the password may be stored as it would be typed by the user. Credential field 748 may also store the credential in an encrypted format, but in one embodiment, in such a format that can be decrypted to reveal the untransformed credential (e.g., a bijective encryption function). In yet another embodiment, credential field 748 may store the credential in one or more transformed formats, including all the relevant transformations for all the services provided by all controllers 210, for example.

Figure 8A:
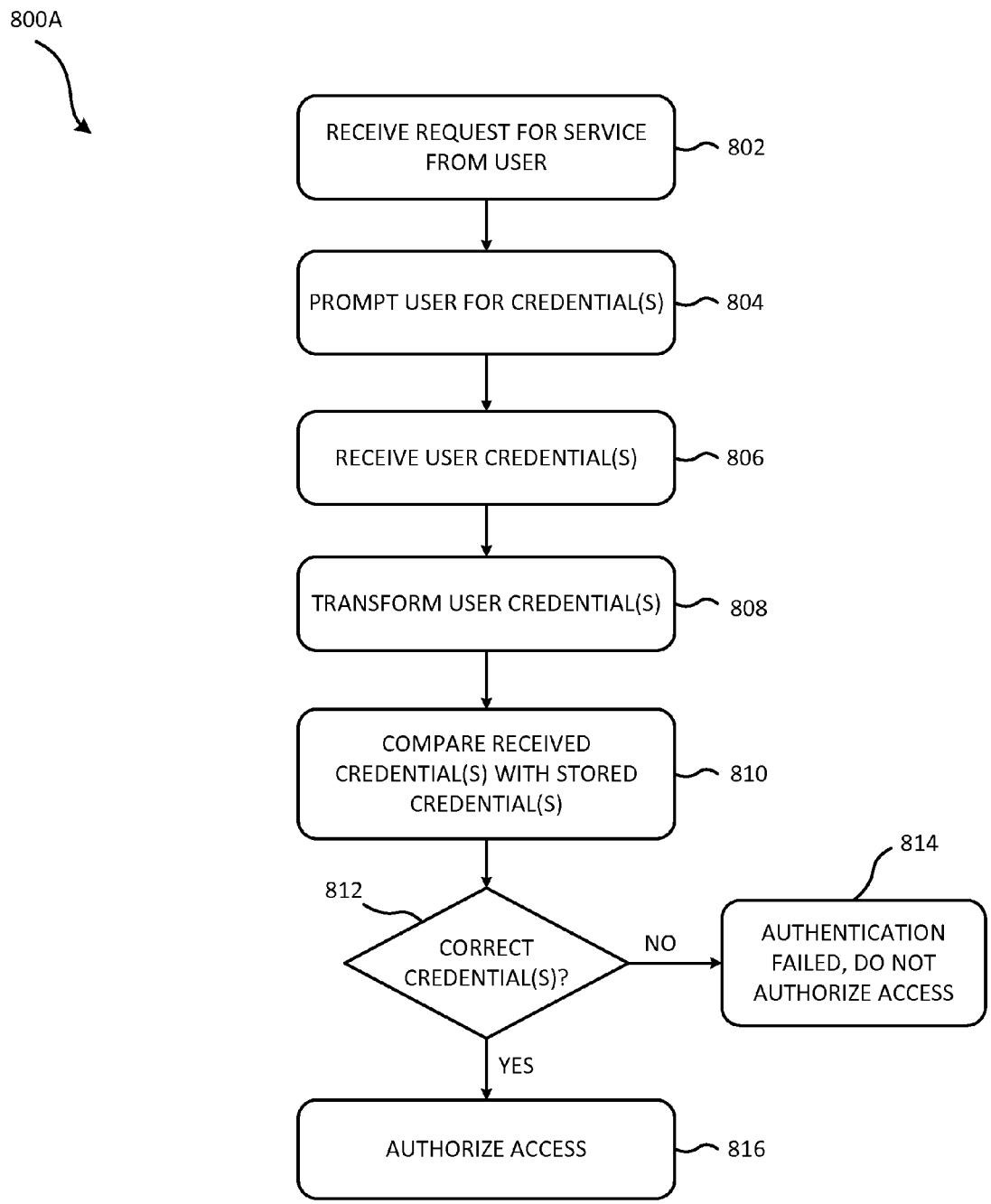
FIG. 8A is a flowchart of an exemplary process for authenticating a user authorized to access a service in a control unit.
Figure 8B:
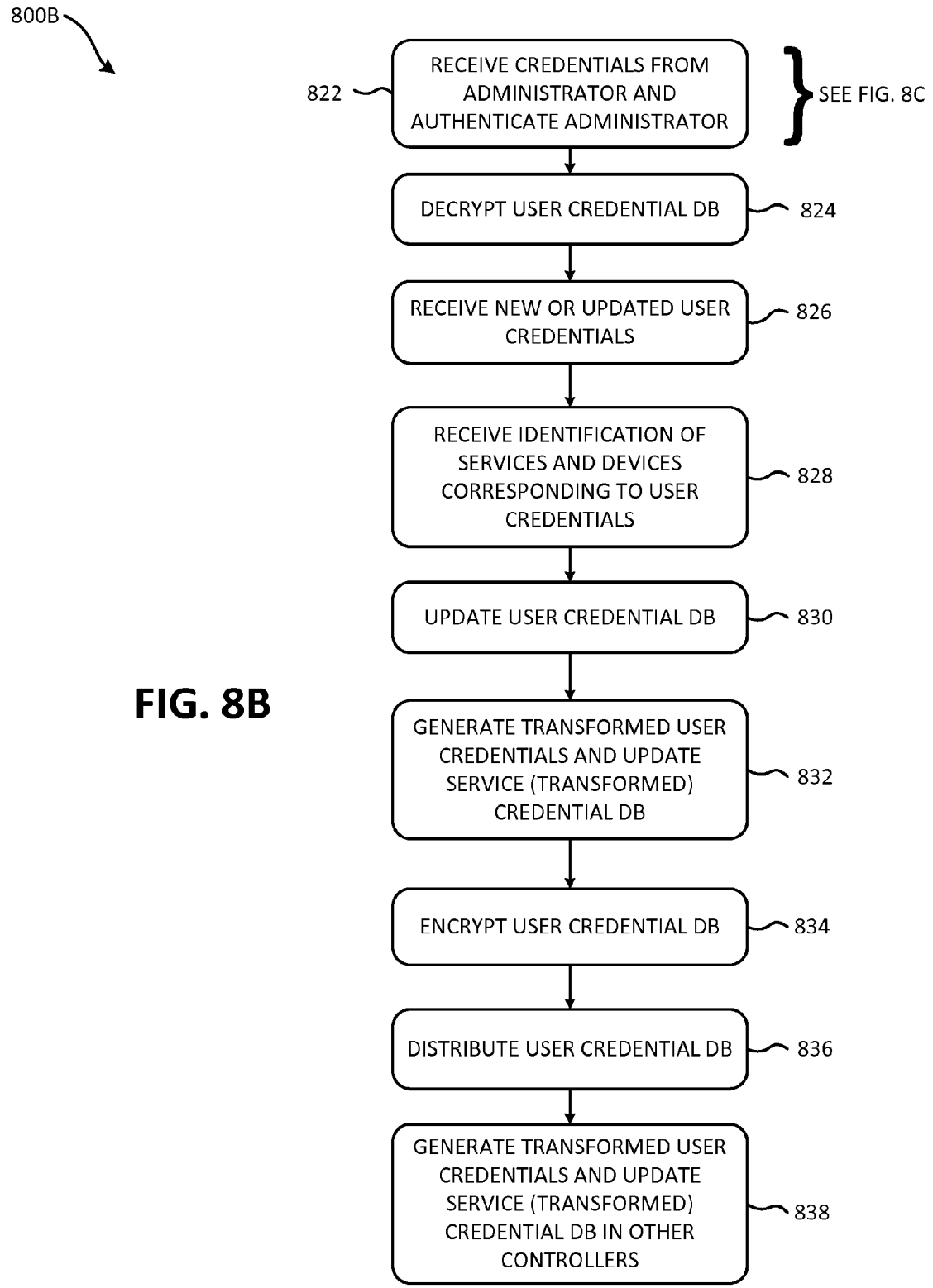
FIG. 8B is a flowchart of an exemplary process for an administrator to update the user credential database of FIGS. 7B and 7C and the service credential database of FIGS. 7D through 7G.

As described in an example below with respect to FIG. 8B, user credential DB 360 (shown in FIG. 7B) is updated to generate user credential DB 360' (shown in FIG. 7C). Changes to updated user credential DB 360' (as compared to user credential DB 360) are shown in bold and with arrows. In updated user credential DB 360', for example, the usernames include Magnus, Sabina, and Gunnar. That is, Gunnar was added as a username to user credential DB 360.

User credential DB 360 may include more, fewer, or different fields than those shown in FIGS. 7B and 7C. For example, in one embodiment, username field 742 may be omitted and credential field 748 may be used to identify the user as well as authenticate the user. Credentials stored in user credential DB 360 may include types of credentials other than or in addition to a username and a password. For example, user credential DB 360 may store a biometric credential (e.g., a fingerprint or an iris scan).

As mentioned above, controller 210 may authenticate users or administrators to access services provided by controller 210. Controller 210 (and the corresponding service) may use service credential DBs to authenticate these users. FIGS. 7D through 7G are block diagrams illustrating service credential DBs in one embodiment (e.g., first service credential DB 356 and second service credential DB 358, each at two different times).

As shown in FIGS. 7D and 7E, first service credential DB 356 may include a username field 722 and a transformed credential field 724. Username field 722 identifies the users authorized to access first service 332. Transformed credential field 724 may include, for example, a cryptographic one-way transformation of a credential, such as a hash of a password concatenated with a salt. In one implementation, the transformation may be specific to the device offering first service 332, such as the salt being the hardware address (e.g., media access control (MAC) address) of the corresponding device (e.g., controller 210). In another implementation, first service credential DB 356 does not store transformed credentials, but the raw credentials themselves or credentials transformed in such as way that the original credentials may be obtained (e.g., a two-way hash, encryption, or a bijective transformation).

Likewise, second service credential DB 358 may include a username field 732 and transformed credential field 734. Username field 732 may identify users authorized to access second service 334. Transformed credential field 734 may include, for example, a cryptographic one-way transformation of a credential (e.g., a password concatenated with a salt). In one implementation, the transformation function used to generate the transformed credential in field 734 is different than the transformation function used to generate the transformed credential in field 724. That is, the transformation function may be specific to the service (e.g., whether the service is first service 332 or second service 334). Further, the transformation may be specific to the device offering second service 334, such as the salt being the hardware address (e.g., MAC address) of the corresponding controller 210. In another implementation, second service credential DB 358 does not store transformed credentials, but the credentials themselves or credentials transformed in such as way that the original credentials may be obtained (e.g., a two-way hash, encryption, or a bijective transformation).

Although the transformed credential for Sabina in first service credential DB 356 (UYDAG in FIG. 7D for SSH) is different than the transformed credential for Sabina in second service credential DB 358 (UHYRV in FIG. 7G for VPN), this corresponds to the same untransformed credential (e.g., password LETMEIN) for both services. Thus, Sabina can log into the SSH server and the VPN server on the particular controller 210-A using the same credentials (e.g., username and password). Further, even though the transformed credentials in first service credential DB 356 and second service credential DB 358 may be different on other controllers 210 (e.g., controllers 210-B through 210-F), these transformed credentials may also correspond to the same untransformed credential (e.g., username and password). Thus, Sabina can log into the SSH server and the VPN server on other controllers 210-B through 210-F using the same credential (e.g., username and password).

As described in the example below with respect to FIG. 8B, first service credential DB 356 (shown in FIG. 7D) is updated to create updated first service credential DB 356' (shown in FIG. 7E). Further, second service credential DB 358 (shown in FIG. 7F) is updated to create (updated) second service credential DB 358' (shown in FIG. 7G). Changes to updated first service credential DB 356' and second service credential DB 358' (as compared to first service credential DB 356 and second service credential DB 358) are shown in bold and with arrows.

First service credential DB 356 and second service credential DB 358 may include more, fewer, or different fields than shown in FIGS. 7D through 7G. For example, in one embodiment, username field 722 or 732 may be omitted and transformed credential field 724 or 734 may be used to identify the user as well as authenticate the user. In another embodiment, credentials stored in credential DBs 356 and/or 358 may include types of credentials other than or in addition to a username and a (transformed) password. For example, credential DBs 356 and 358 may store a biometric credential (e.g., a fingerprint or an iris scan).

As mentioned above, one embodiment allows for a user to access multiple services across multiple devices while using the same credential(s) (e.g., the same username and password). Further, one embodiment allows for changes to the credential(s) to be propagated among devices in a distributed network, such as controllers 210 in units 115 of control system 110. FIG. 8A is a flowchart of an exemplary process 800A for authenticating a user authorized to access a service in a controller 210. Process 800 may be performed by a service or services (e.g., first service 332 and/or second service 334) running in controller 210, for example. Each service may execute its own version of process 800 to authenticate one or more users to access that particular service. In the example below, first service 332 is an SSH server and second service 334 is a VPN server. Further, the particular controller 210 includes user credential DB 360 as shown in FIG. 7B, first service (SSH) credential DB 356 as shown in FIG. 7D, and second service (VPN) credential DB 358 as shown in FIG. 7F.

In this example, process 800A starts with the receipt of a request for a service from a user (block 802). Assume that the requested service is an SSH server that requires a username and password for authentication, and the user wishes to log into controller 210 using an SSH client running in administration device 130 (where the user is remotely located). In this case, the service (SSH server) prompts the user for credential(s) (block 804), e.g., a username and password. The service (SSH server) receives the user credential(s) (block 806) and, in one embodiment, transforms the user credential(s) (block 808). Examples of transformations of credentials are discussed above with respect to transformed credential generator 386.

To authenticate the user, the service (SSH server) compares the received credentials (e.g., transformed) with the stored credential(s) (block 810). Comparing the received credentials with the stored credential(s) may include transforming the received credentials. As described above, the credentials for the service are stored in first service (first transformed) credential DB 356 in storage layer 350 of controller 210. If the credentials are not identical (e.g., the received credential is not correct) (block 812: NO), then authorization fails and access to the service (SSH server) is not authorized (block 814). If the received credential(s) (which may have been transformed) are correct (e.g., a match) (block 812: YES), then authentication is a success and access to the service (SSH server) is authorized (block 816).

For example, user Sabina may use administration device 130 to attempt to log into controller 210-A of unit 115-A (see FIG. 5) with an SSH client. She is prompted to enter her username (Sabina) and password (LETMEIN), which she does. Assume that controller 210-A stores first service (SSH) credential DB 356 as shown in FIG. 7D. Service 332 (SSH) of controller 210-A transforms password "LETMEIN" to UYDAG, which matches the transformed credential stored in credential DB 356 and user Sabina is successfully authenticated and authorized to access the SSH service in controller 210-A. In this example, Sabina may also be able to log into an SSH server on a controller 210-B with the same username and password (Sabina, LETMEIN) because SSH credential DB 356 in controller 210-B is configured in this manner. In fact, Sabina may be able to log into a VPN server on multiple controllers 210 with the same username and password (Sabina, LETMEIN) because the VPN credential DB 358 stored in each controller 210 configured in this manner. For example, the transformed credential in the SSH credential table (first service credential DB 356) corresponds to the same password as the transformed credential in the VPN credential table (second service credential DB 358). Sabina, however, wishes to change her password from "LETMEIN" to "GOTLAND" for all the services (SSH and VPN) and all the controllers 210-A through 210-F in control system 110. Sabina's wish, however, potentially causes a burden if an administrator (or Sabina) had to change the password for each device and each service.

Embodiments disclosed herein may allow Sabina (or an administrator) to change her password in user credential DB 360 on one controller 210 for service(s) and have that change propagated to other controllers 210. In this case, administrator authenticator logic 382 may authenticate the same user (e.g., Sabina) with a same credential for multiple services and/or for multiple services on multiple devices. FIG. 8B is a flowchart of an exemplary process 800B for an administrator to update user credential DB 360 and service credential DBs (e.g., DBs 356 and 358). In the example below, an administrator uses administration device 130 to log into controller 210. In one embodiment, the administrator may log into any one of the controllers 210, as the changes to the user credential database may be distributed to the other controllers 210 (and other service credential DBs) as needed. In this example, an administrator logs into controller 210-A and process 800B is performed by user credential update logic 384 in controller 210-A of unit 115-A.

Process 800B begins with the receipt of credential(s) from the administrator logging into controller 210 and authenticating the administrator (block 822). The administrator logs into controller 210-A for the purpose of updating Sabina's password, for example (e.g., in user credential DB 360 stored in controller 210-A). The method and process for authenticating the administrator is discussed below with respect to FIG. 8C. In this example, assume that the administrator has been successfully authenticated and process 800B proceeds to block 824. If user credential DB 360 is encrypted, then it is decrypted (block 824). In one embodiment, as described with respect to FIG. 8C, the key used to decrypt user credential DB 360 is only available when the administrator is successfully authenticated. Decrypting user credential DB 360 allows the administrator to edit and change entries in the DB. In other embodiments, the key used to decrypt user credential DB 360 is stored in controller 210 without encryption.

The administrator, once authenticated, can edit and change the information in user credential DB 360, including the credential(s) in field 748, the username(s) in username field 742, the service(s) in service field 744, and/or the device(s) in device field 746. These new and/or updated credential(s) (which may include username(s)) are received by controller 210-A (block 826). The identified services and the identified devices corresponding to the credential(s) are also received (block 828) and the user credential DB 360 in controller 210-A is updated (block 830). For example, the administrator may add or delete a user who is authorized to access a particular service provided by controller 210-A or a service provided by one of the other controllers 210-B through 210-F. The administrator may change the credential (e.g., password) stored in credential field 748, for example. Further, the administrator may change the controller(s) 210 to which the corresponding credential applies.

For example, as shown in FIGS. 7A and 7B, the administrator adds username Gunnar to user credential DB 360 (FIG. 7A) to generate user credential DB 360' (FIG. 7B). Updated user credential DB 360' indicates that Gunnar has access to the VPN service on controllers 210-A, 210-B, and 210-C, but not in camera 260 (which in this example includes a controller) (as defined in device field 746). For the VPN service provided by these identified controllers (in device field 746), Gunnar may use the username "Gunnar" and the password "MUNKKALLAREN" for authentication. Also, the administrator changes the credential (i.e., password) from "LETMEIN" to "GOTLAND" for username Sabina for the SSH and VPN services for all the devices in control system 110 (but for controller 210-F).

If there is a change to user credential DB 360, then transformed user credentials are generated (e.g., based on the updated and/or unencrypted user credentials) and the service credential DBs (e.g., first service credential DB 356 and/or second service credential DB 358) are updated (block 832). The credentials stored in user credential DB 360 are transformed appropriately for the service and the device. As described above, transformed credential generator 386 may transform the credentials based on rules (and other information) stored in credential transformation rules DB 388. For example, generator 386 may use a cryptographic one-way function for the SSH service (e.g., the SHA-224 cryptographic hash function salted with the Ethernet MAC address of the local device) to generate the transformed credential. In this case, process 800B (e.g., controller 210 executing credential update logic 384 that employs transformed credential generator 386) generates the updated or new transformed credentials for the SSH server on the device.

In one embodiment, the user credential DB 360 is encrypted (block 834) (e.g., after service credential DBs are updated, when the administrator logs out, etc.) and stored in storage layer 350 of controller 210-A. The user credential DB 360 may also be distributed to other controllers 210 (block 836), such as controllers 210-B through 210-F (e.g., connected in a peer-to-peer network). As described below, user credential DB 360 may be distributed to other controllers 210 for the other devices to generate transformed credential DBs for authenticating users to access services provided by the corresponding other devices. In this case, distribution layer 340 may distribute user credential DB 360 to the other devices as described above. In one embodiment, user credential DB 360 is distributed to less than all controllers 210 if, for example, one of controllers 210 is located in an insecure area.

In one embodiment, user credential DB 360 is distributed in an encrypted format. In this case, the key used to encrypt user credential DB 360 (the "master key") may also be stored and used on other controllers 210. In this case, other controllers 210 may use user credential DB 360 even though it is distributed in an encrypted format. In an alternative embodiment, user credential DB 360 is distributed in an unencrypted format (but the links between controllers 210 may be encrypted).

A change in user credential DB 360 in controller 210-A may also result in changes to service credential DBs in other controllers 210 (e.g., controllers 210-B through 210-F). For example, controller 210-B may receive updates to user credential DB 360 distributed by controller 210-A. That is, additional transformed user credentials may be generated and service credential DBs in other controllers 210 may be updated (block 838). This may be done in numerous ways, as described below. Likewise, in a different example, controller 210-A may receive (block 836) updates to user credential DB 360 distributed by other controllers 210 (e.g., controllers 210-B through 210-F in a peer-to-peer network) and may generate transformed user credentials and update service credential DBs in controller 210-A (block 838). In this latter example, an administrator may log into controller 210-B to update user credential DB 360.

In one embodiment, credential transformation rules DB 388 (e.g., stored in controller 210-A) may store the rules and information (e.g., device specific information) for services on other controllers 210 (e.g., controller 210-B through 210-F) as well as itself. Thus, transformed credential generator 386 in controller 210-A may generate transformed credentials for other services on other controllers 210 (e.g., controller 210-A through 210-F) as well as itself. In this case, the service credential DBs may be distributed to the appropriate controller 210 from the controller from which the administrator logged in. Further, the service credential DBs may be distributed in an unencrypted fashion, as the credentials may already have been transformed. Nonetheless, even though the service credential DBs may be distributed in an unencrypted fashion, the communication links between controllers 210 may be still be encrypted (e.g., by SSL/TLS).

In another embodiment, each controller 210 may be responsible for generating its own service credential DBs. In this case, transformed credential generator 386 (on a controller other than controller 210-A) may detect that user credential DB 360 has changed and may update its own local service credential DBs. In this case, if user credential DB 360 and the master key are encrypted, controller 210 (e.g., controller 210-B through 210-F) cannot access credential DB 360 without the master key. In one embodiment, when an administrator logs into controller 210-A, information sufficient for the other controllers 210 (e.g., controllers 210-B through 210-F) to determine or decrypt the master key is communicated to the other controllers 210 (e.g., using encrypted links). Thus, the other controllers 210 (e.g., controllers 210-B through 210-F) may decrypt distributed updates to credential DB 360 received from the controller 210 that the administrator logged into (e.g., controller 210-A). In one embodiment, the master key is never stored in a non-volatile memory in any controller 210. In other embodiments, the master key may be stored in non-volatile memory. Alternatively, the administrator may be required to log into each controller 210 so that the corresponding local service credential DBs can be updated. In another embodiment, after user credential DB 360 is updated in controller 210-A (in which the administrator is logged in), and after user credential DB 360 has been distributed to other controllers 210-B, for example, controller 210-A may log the administrator into the other controller 210-B using the password provided by the administrator. In this way, the controller 210-A that received the updates to user credential DB 360 from the administrator may ensure that the other controllers 210-B through 210-F update their respective service credential DBs.

Figure 8C:
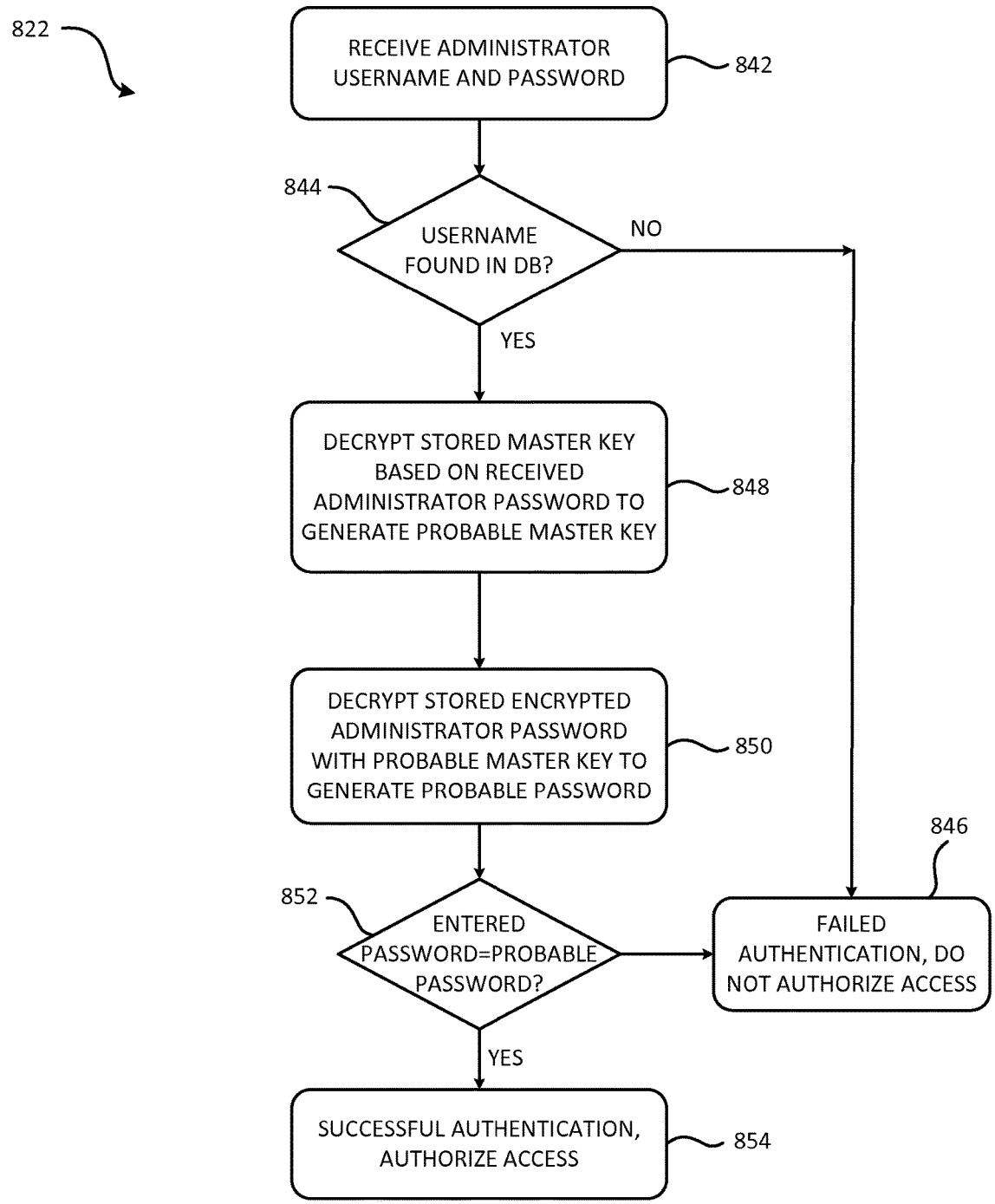
FIG. 8C is a flowchart of an exemplary process for authenticating an administrator in one embodiment.

As discussed above with respect to FIG. 8B, an administrator may use administration device 130 to log into controller 210. FIG. 8C is a flowchart of a process 822 for authenticating an administrator in one embodiment. Although process 822 may be used to authenticate an administrator to update user credential DB 360, authentication process 822 may also be used to authenticate the administrator to perform other tasks with respect to controller 210.

Process 822 begins with the receipt of an administrator username and password (i.e., credentials) (block 842) from the administrator logging into controller 210 of unit 115. Process 822 queries administrator credential DB 354 to determine if a username exists that matches the entered username. If a matching username is not found in administrator credential DB 354 (block 844: NO), then authentication fails and access to controller 210 is not authorized (block 846). If a matching username is found in administrator credential DB 354 (block 844: YES), then process 822 continues to block 848 to determine whether authentication is a success or not.

The stored encrypted master key (stored in encrypted master key field 706) is decrypted based on the received administrator password to generate what is referred to as a "probable master key" (block 848), given that it is only assumed that the received administrator password is probably correct for the time being. The stored administrator password is then decrypted based on the probable master key to generate what is referred to as a "probable administrator password" (block 850). If the received administrator password is not identical to the probable administrator password (block 852: NO), then authentication fails and access to controller 210 is not authorized (block 846). If the received administrator password is the same as the probable administrator password (block 852: YES), then authentication is a success and access to controller 210 is authorized (block 854). In this case (block 854: YES), returning to FIG. 8B (block 824), if user credential DB 360 is encrypted, then administration logic 323 may decrypt user credential DB 360 based on the master key (which is the same as the probable master key in this case). Because the encrypted master key is decrypted based on the administrator password, in this embodiment, administration logic 323 decrypts the user credential DB 360 based on the entered administrator password as well (which is the same as the probable administrator password in this case).

Variations of process 822 are possible. For example, in one embodiment, a password entered by an administrator is not used. Rather, the administrator may provide a secret by other means (such as through client software in administration device 130 with a key or password management system). Further, in one embodiment, the administrator does not provide a username. In this case, process 822 may be executed for each entry or record in administrator credential DB 354, for example, to determine whether authentication is successful or not.

This application incorporates by reference the following applications filed the same day as the present patent application: U.S. application Ser. No. 14/028,218, titled "Event Timeline Generation"; U.S. application Ser. No. 14/028,118, titled "Control System Configuration Within an Operational Environment"; U.S. application Ser. No. 14/028,236, titled "Anonymous Decisions in an Access Control System"; U.S. application Ser. No. 14/028,243, titled "Consensus Loss in Distributed Control Systems"; U.S. application Ser. No. 14/028,059, titled "Joining a Distributed Database"; U.S. application Ser. No. 14/028,198, titled "Distributed Events in an Access Control System"; and U.S. application Ser. No. 14/028,230, titled "Managing Application Data in Distributed Control Systems".

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIGS. 8A through 8C the order of the blocks and/or signal flows may be modified in other implementations. Further, non-dependent blocks and/or signal flows may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

The terms "comprises" and/or "comprising," as used herein specify the presence of stated features, integers, steps or components but do not preclude the presence or addition of one or more other features, integers, steps, components or groups thereof. Further, the term "exemplary" (e.g., "exemplary embodiment," "exemplary configuration," etc.) means "as an example" and does not mean "preferred," "best," or likewise.

No element, act, or instruction used in the present application should be construed as critical or essential to the embodiments unless explicitly described as such. Also, as used herein, the article "a" is intended to include one or more items. For example, "a processor" may include one or more processors (e.g., a microprocessor and a circuit dedicated to encryption and/or decryption). In addition, if "each of" a plurality of devices is described as including a feature, not all devices necessarily include that feature. That is, other devices (other than the plurality defined as having the feature) may not include the feature. Further, the phrase "based on" is intended to mean "based, at least in part, on" unless explicitly stated otherwise.

What is claimed is:

1. A device including:
a memory to store a user credential database (DB) for storing untransformed credentials, a first transformed credential DB for authenticating users for accessing a first service provided by the device, and a second transformed credential DB for authenticating users for accessing a second service provided by the device;
a communication interface to receive an untransformed credential;
a processor to:
update the first transformed credential DB and the second transformed credential DB based on the user credential DB,
transform the received untransformed credential to generate a transformed received credential, and
compare the transformed received credential to a first transformed credential stored in the first transformed credential DB to determine whether the received untransformed credential is correct or not correct to complete authentication of a user to access the first service or compare the transformed received credential to a second transformed credential stored in the second transformed credential DB to determine whether the received untransformed credential is correct or not correct to complete authentication of the user to access the second service; and
wherein the communication interface is configured to:
distribute the user credential DB to a plurality of other devices connected in a peer-to-peer network for the other devices to generate transformed credential DBs for authenticating users to access services provided by the other devices, and
receive the user credential DB from the other devices in the peer-to-peer network.

2. The device of claim 1,
wherein the user credential DB is an encrypted user credential DB, wherein the encrypted user credential DB stores untransformed user credentials, and wherein the processor is configured to decrypt the encrypted user credential DB and to generate the first transformed DB and second transformed credential DB based on the decrypted user credential DB; and
wherein the communication interface is configured to distribute the encrypted user credential DB to the other devices for the other devices to generate the other transformed credential DBs for authenticating users to access services provided by the other devices.

3. The device of claim 2,
wherein the first service includes one of a secure shell (SSH) server, a file transfer protocol (FTP) server, a remote desktop protocol (RDP) server, a virtual private network (VPN) server, or a virtual network channel (VNC) server,
wherein the second service is different than the first service and includes one of a secure shell (SSH) server, a file transfer protocol (FTP) server, a remote desktop protocol (RDP) server, a virtual private network (VPN) server, or a virtual network channel (VNC) server,
wherein the user credential DB stores unhashed credentials, the first transformed credential DB stores first hashed credentials, and the second transformed credential DB stores second hashed credentials;
wherein the processor is configured to update the first transformed credential DB and the second transformed credential DB by:
performing a first hashing operation on the unhashed credentials stored in the user credential DB to generate the first hashed credentials to store in the first transformed credential DB, and
performing a second hashing operation on the unhashed credentials stored in the user credential DB to generate the second hashed credentials to store in the second transformed credential DB,
wherein the processor is configured to:
determine that the untransformed credential is correct when the transformed received credential is identical to the first transformed credential and determine that the untransformed credential is not correct when the transformed received credential is not identical to the first transformed credential, or
determine that the untransformed credential is correct when the transformed received credential is identical to the second transformed credential and determine that the untransformed credential is not correct when the transformed received credential is not identical to the first transformed credential.

4. The device of claim 2,
wherein the processor is configured to generate the first transformed credential DB by transforming credentials from the decrypted user credential DB using a cryptographic one-way function; and
wherein the processor is configured to generate the second transformed credential DB by transforming credentials from the decrypted user credential DB using a cryptographic one-way function.

5. The device of claim 4, wherein the first transformed credential DB and the second transformed credential DB are each configured to authenticate a same user with a same credential.

6. The device of claim 4,
wherein the processor is configured to receive updated user credentials from an administrator, update the user credential DB, generate the first transformed credential DB and the second transformed credential DB based on the updated user credential DB, and
wherein the communication interface is configured to distribute the updated user credential DB to the other devices for the other devices to generate the other transformed credential DBs for authenticating users to access services provided by the other devices.

7. The device of claim 2, wherein the processor is configured to decrypt the encrypted user credential DB based on a password received through the communication interface from an administrator, the device further comprising:
a housing enclosing the memory, the communication interface, and the processor, wherein the housing physically separates the device from the plurality of other devices connected in the peer-to-peer network.

8. The device of claim 7, wherein the processor is configured to:
decrypt, based on the password received through the communication interface from the administrator, an encrypted key to generate an unencrypted key; and
decrypt the encrypted user credential DB based on the unencrypted key.

9. The device of claim 8, wherein the processor if further configured to:
decrypt an encrypted administrator password based on the key, to generate a decrypted administrator password; and
authorize access when the password received from the administrator is identical to the decrypted administrator password.

10. A method including:
storing a user credential database (DB) to store untransformed credentials, a first transformed credential DB for authenticating users to access a first service provided by a device, and a second transformed credential DB for authenticating users to access a second service provided by the device;
generating the first transformed credential DB and the second transformed credential DB based on the user credential DB;
receiving an untransformed credential in the device and transforming the credential to generate a transformed received credential;
comparing the transformed received credential to a first transformed credential stored in the first transformed credential DB to determine whether the received untransformed credential is correct or not correct to complete authentication of a user to access the first service or comparing the received credential to a second transformed credential stored in the second transformed credential DB to determine whether the received untransformed credential is correct or not correct to complete authentication of the user to access the second service;
distributing the user credential DB to a plurality of other devices connected in a peer-to-peer network for the other devices to generate transformed credential DBs for authenticating users to access services provided by the other devices; and
receiving the user credential DB from the other devices in the peer-to-peer network.

11. The method of claim 10, wherein the user credential DB is an encrypted user credential DB, wherein the encrypted user credential DB stores untransformed credentials, the method further comprising:
decrypting the encrypted user credential DB and generating the first and second transformed credential DB based on the decrypted user credential DB; and
distributing the encrypted user credential DB to the other devices for each of the other devices to generate corresponding transformed credential DBs for authenticating users to access services provided by the corresponding device.

12. The method of claim 11, further comprising:
generating the first transformed credential DB by transforming credentials from the decrypted user credential DB using a first cryptographic one-way function; and
generating the second transformed credential DB by transforming credentials from the decrypted user credential DB using a second cryptographic one-way function.

13. The method of claim 12, wherein the first transformed credential DB and the second transformed credential DB are each configured to authenticate a same user with a same credential.

14. The method of claim 12, further comprising:
receiving updated user credentials from an administrator, updating the user credential DB;
updating the first transformed credential DB and the second transformed credential DB based on the updated user credential DB; and
distributing the updated user credential DB to the other devices for each of the other devices to generate corresponding transformed credential DBs for authenticating users to access services provided by the corresponding device.

15. The method of claim 12, further comprising decrypting the encrypted user credential DB based on a password received through from an administrator.

16. The method of claim 15,
wherein decrypting the encrypted user credential DB based on the password received from the administrator comprises:
decrypting an encrypted key, to generate a key, based on the password received from the administrator, and
decrypting the encrypted user credential DB based on the key.

17. The method of claim 16, further comprising:
decrypting an encrypted administrator password based on the key, to generate a decrypted administrator password; and
authorizing access when the password received from the administrator is identical to the decrypted administrator password.

18. A system including:
a plurality of devices communicating over a network, wherein each device includes:
- a memory to store a user credential database (DB) having untransformed user credentials, a first transformed credential DB for authenticating users to access a first service provided by the corresponding device, and a second transformed credential DB for authenticating users to access a second service provided by the corresponding device;
- a communication interface to receive an untransformed credential;
- a processor to:
    - update the first transformed credential DB and the second transformed credential DB based on the user credential DB, and
    - transform the received untransformed credential to generate a transformed received credential,
    - compare the transformed received credential to a first transformed credential stored in the first transformed credential DB or compare the transformed received credential to a second transformed credential stored in the second transformed credential DB to determine whether the received untransformed credential is correct or not correct for completing authentication of a user to have access to the first or the second service; and
- wherein the communication interface is further configured to:
    - distribute the user credential DB to the other devices for each of the other devices to generate corresponding transformed credential DBs for authenticating users to access services provided by the corresponding device, and
    - receive the user credential DB from the other devices.

19. The system of claim 18, wherein the plurality of devices are connected in a peer-to-peer network and distribute the user credential DB among the devices in the peer-to-peer network.

20. The system of claim 18,
wherein the user credential DB is an encrypted user credential DB, wherein the encrypted user credential DB stores untransformed credentials, and wherein the processor is configured to decrypt the encrypted user credential DB and to generate the first and second transformed credential DB based on the decrypted user credential DB; and
wherein the communication interface is configured to distribute the encrypted user credential DB to the other devices for each of the other devices to generate corresponding transformed credential DBs for authenticating users to access services provided by the corresponding device.

21. The system of claim 18,
wherein the processor is configured to generate the first transformed credential DB by transforming credentials from the decrypted user credential DB using a first cryptographic one-way function; and
wherein the processor is configured to generate the second transformed credential DB by transforming credentials from the decrypted user credential DB using a second cryptographic one-way function.

* * * * *

UNITED STATES PATENT AND TRADEMARK OFFICE
CERTIFICATE OF CORRECTION

PATENT NO. : 9,641,335 B2
APPLICATION NO. : 14/028208
DATED : May 2, 2017
INVENTOR(S) : Mathias Bruce et al.

It is certified that error appears in the above-identified patent and that said Letters Patent is hereby corrected as shown below:

In the Claims

Claim 9, at Column 25, Line 41 replace the word "if" with "is"

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*